(12) United States Patent
Yang et al.

(10) Patent No.: US 12,168,254 B2
(45) Date of Patent: *Dec. 17, 2024

(54) ADDITIVELY MANUFACTURED CASTING CORE-SHELL MOLD AND CERAMIC SHELL WITH VARIABLE THERMAL PROPERTIES

(71) Applicant: General Electric Company, Schenectady, NY (US)

(72) Inventors: Xi Yang, Mason, OH (US); Michael Cole, Mason, OH (US); Michael Brown, Dayton, OH (US); Gregory Terrence Garay, West Chester, OH (US); Tingfan Pang, West Chester, OH (US); Brian David Przeslawski, Liberty Township, OH (US); Douglas Gerard Konitzer, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,368

(22) Filed: Oct. 25, 2021

(65) Prior Publication Data

US 2022/0040754 A1    Feb. 10, 2022

Related U.S. Application Data

(62) Division of application No. 15/636,389, filed on Jun. 28, 2017, now Pat. No. 11,173,542.

(51) Int. Cl.
*B22C 9/10* (2006.01)
*B22C 9/04* (2006.01)
(Continued)

(52) U.S. Cl.
CPC ............. *B22C 9/10* (2013.01); *B22C 9/04* (2013.01); *B22D 29/002* (2013.01); *B28B 1/001* (2013.01);
(Continued)

(58) Field of Classification Search
CPC .. B22C 7/02; B22C 9/04; B22C 9/043; B22C 9/10; B22C 9/22; B22D 29/00; B22D 29/002
(Continued)

(56) References Cited

U.S. PATENT DOCUMENTS 3,222,737 A   12/1965 Reuter
3,385,346 A   5/1968 Fleck
(Continued)

FOREIGN PATENT DOCUMENTS

CN   101073821 A   11/2007
CN   101219461 A   7/2008
(Continued)

OTHER PUBLICATIONS

Advanced Filtration to Improve Single Crystal Casting Yield-Mikro Systems, National Energy Technology Laboratory (NETL), Aug. 2013, 4 Pages. https://www.netl.doe.gov/sites/default/files/2017-12/SC0008266.pdf.

*Primary Examiner* — Kevin P Kerns
(74) *Attorney, Agent, or Firm* — Dority & Manning, P.A.

(57) ABSTRACT

A method of forming a cast component and a method of forming a casting mold. The method is performed by connecting at least one wax gate component to a ceramic core-shell mold. The ceramic core-shell mold includes at least a filter, first core portion, a first shell portion, and at least one first cavity between the core portion and the first shell portion. The core-shell mold may manufactured using an additive manufacturing process and may include an
(Continued)

integrated ceramic filter. At least a portion of the ceramic core-shell mold and the wax gate component is coated with a second ceramic material. The wax gate component is then removed to form a second cavity in fluid communication with the first cavity.

11 Claims, 22 Drawing Sheets

(51) Int. Cl.
  *B22D 29/00* (2006.01)
  *B28B 1/00* (2006.01)
  *B28B 7/34* (2006.01)
  *B32B 18/00* (2006.01)
  *B33Y 10/00* (2015.01)
  *B33Y 80/00* (2015.01)
  *C04B 35/14* (2006.01)

(52) U.S. Cl.
  CPC ............ *B28B 7/346* (2013.01); *B32B 18/00* (2013.01); *B33Y 10/00* (2014.12); *B33Y 80/00* (2014.12); *C04B 35/14* (2013.01); *C04B 2235/6026* (2013.01); *C04B 2235/6027* (2013.01); *C04B 2237/341* (2013.01); *C04B 2237/62* (2013.01)

(58) Field of Classification Search
  USPC ............ 164/23, 24, 516, 361, 365, 369, 138
  See application file for complete search history.

(56) References Cited

U.S. PATENT DOCUMENTS

| | | |
|---|---|---|
| 3,420,291 A | 1/1969 | Chandley et al. |
| 3,441,078 A | 4/1969 | Chandley |
| 4,574,866 A | 3/1986 | Tom |
| 5,256,340 A | 10/1993 | Allison et al. |
| 5,295,530 A | 3/1994 | O'Connor et al. |
| 5,387,380 A | 2/1995 | Cima et al. |
| 5,599,166 A | 2/1997 | Deptowicz et al. |
| 6,193,922 B1 * | 2/2001 | Ederer .................... B29C 64/40 264/401 |
| 7,172,012 B1 | 2/2007 | Memmen |
| 7,413,001 B2 | 8/2008 | Wang et al. |
| 8,668,800 B2 | 3/2014 | Guitton |
| 8,851,151 B2 | 10/2014 | Frasier et al. |
| 9,079,357 B2 | 7/2015 | Ebert et al. |
| 9,435,211 B2 | 9/2016 | Xu |
| 10,118,217 B2 * | 11/2018 | Hardwicke et al. ..... B22C 9/101 |
| 11,173,542 B2 * | 11/2021 | Yang et al. ............... B22C 9/10 |
| 2004/0045692 A1 | 3/2004 | Redemske |
| 2005/0189086 A1 | 9/2005 | Caputo et al. |
| 2006/0065383 A1 | 3/2006 | Ortiz et al. |
| 2007/0215315 A1 | 9/2007 | Redemske et al. |
| 2008/0135202 A1 | 6/2008 | Lee et al. |
| 2009/0065168 A1 | 3/2009 | Hasselberg et al. |
| 2011/0132562 A1 | 6/2011 | Merrill et al. |
| 2011/0310370 A1 | 12/2011 | Rohner et al. |
| 2012/0248657 A1 | 10/2012 | Ebert et al. |
| 2012/0291983 A1 | 11/2012 | Graham et al. |
| 2014/0262116 A1 | 9/2014 | Farkas |
| 2015/0096713 A1 | 4/2015 | Marcin |
| 2015/0306657 A1 | 10/2015 | Frank |
| 2015/0322799 A1 | 11/2015 | Xu |
| 2016/0038866 A1 | 2/2016 | Gibson et al. |
| 2016/0039006 A1 | 2/2016 | Amstutz et al. |
| 2016/0325493 A1 | 11/2016 | DeSimone et al. |
| 2016/0346831 A1 | 12/2016 | Snyder et al. |
| 2016/0375609 A1 | 12/2016 | Sander et al. |
| 2017/0008072 A1 | 1/2017 | Cui et al. |
| 2017/0008080 A1 | 1/2017 | Xu |
| 2018/0161852 A1 | 6/2018 | McCarren et al. |
| 2018/0161853 A1 | 6/2018 | Deines et al. |
| 2018/0161854 A1 | 6/2018 | Deines et al. |
| 2018/0161855 A1 | 6/2018 | Deines et al. |
| 2018/0161857 A1 | 6/2018 | Garay et al. |
| 2018/0161858 A1 | 6/2018 | Garay et al. |
| 2018/0161859 A1 | 6/2018 | Garay et al. |
| 2018/0161866 A1 | 6/2018 | Deines et al. |
| 2019/0001402 A1 | 1/2019 | Yang et al. |
| 2019/0001403 A1 | 1/2019 | Yang et al. |
| 2019/0001405 A1 | 1/2019 | Yang et al. |
| 2019/0358850 A1 | 11/2019 | Yang et al. |
| 2020/0030872 A1 | 1/2020 | Yang et al. |
| 2022/0080495 A1 * | 3/2022 | Yang et al. ............ B33Y 80/00 |

FOREIGN PATENT DOCUMENTS

| | | |
|---|---|---|
| CN | 101306465 A | 11/2008 |
| CN | 104493081 A | 4/2015 |
| CN | 105142819 A | 12/2015 |
| CN | 105855469 A | 8/2016 |
| FR | 3023196 A1 | 1/2016 |
| WO | WO2010045950 A1 | 4/2010 |

* cited by examiner

ADDITIVELY MANUFACTURED CASTING CORE-SHELL MOLD AND CERAMIC SHELL WITH VARIABLE THERMAL PROPERTIES

CROSS REFERENCE TO RELATED APPLICATIONS

This application is a divisional of U.S. application Ser. No. 15/636,389 filed on Jun. 28, 2017, titled "ADDITIVELY MANUFACTURED CASTING CORE-SHELL MOLD AND CERAMIC SHELL WITH VARIABLE THERMAL PROPERTIES", now U.S. Pat. No. 11,173,542, which is herein incorporated by reference in its entirety.

INTRODUCTION

The disclosure generally relates to investment casting core-shell mold components and processes utilizing these components. The core-shell mold made in accordance with the present invention includes integrated ceramic filaments between the core and shell of the mold that can be utilized to form passages and/or holes in the cast component made from these molds. The integrated core-shell molds provide useful properties in casting operations, such as in the casting of superalloys used to make turbine blades and stator vanes for jet aircraft engines or power generation turbine components. The disclosure also relates to the coating of an integrated core-shell mold with a ceramic outer layer, which may provide any one or combination of the following exemplary benefits: to increase structural integrity of the core-shell mold; to bond or connect portions of the mold; to provide passageways or cavities in fluid communication with the mold; to control structural properties of the mold; and/or to control thermal properties of the mold.

BACKGROUND

A gas turbine engine generally includes at least one compressor to pressurize air to be channeled into a combustor. The engine may include at least one combustor in which at least a portion of the channeled pressurized air is mixed with fuel and ignited. Hot gasses from the compressor flow downstream through at least one turbine section. Each turbine section has rotating blades rotating about an axis and contained within an engine housing. The turbine section or sections may power any one of the compressor, a fan, a shaft, and/or may provide thrust through expansion through a nozzle, for example.

The turbine blades and/or stator vanes in the turbine portions must be able to withstand thermal stresses due to high temperatures and large temperature fluctuations as well as forces due to the high rotational speed experienced during normal operation of the turbine. As the pressure ratio and efficiency of turbines have increased, the thermal stresses the high pressure and low pressure turbine portions are exposed to have also increased. Accordingly, in combination with manufacturing components of the turbine (e.g. turbine blades and stator vanes) from a high-temperature resistant material, effective cooling of the turbine blades, stator vanes and other components have become increasingly important and challenging. To counteract the radiation and convection of heat to the turbine section, several heat removal techniques have been employed in the past; fluid cooling is generally employed to prolong the life of the turbine components. Further, small cooling holes have been drilled though the blade at angles optimized to remove heat and provide a thermal barrier on the surface of each airfoil surface of the turbine blades and stator vanes. Passages are also formed within the turbine and/or stator vanes to provide convection cooling of the surface of each airfoil.

The desire for increased cooling efficiency within turbine engine has led to complex internal cooling passages within turbine components. Conventional techniques for manufacturing engine parts and components involve the process of investment or lost-wax casting. One example of investment casting involves the manufacture of a typical blade used in a gas turbine engine. A turbine blade and/or stator vane typically includes hollow airfoils that have radial channels extending along the span of a blade having at least one or more inlets for receiving pressurized cooling air during operation of the engine. Various cooling passages in a blade typically include a serpentine channel disposed in the middle of the airfoil between the leading and trailing edges. The airfoil typically includes inlets extending through the blade for receiving pressurized cooling air, which include local features such as short turbulator ribs or pins for increasing the heat transfer between the heated sidewalls of the airfoil and the internal cooling air.

The manufacture of these turbine blades, typically from high strength, superalloy metal materials, involves numerous steps as shown in FIGS. 1-4. As shown in FIG. 1, forming a cast component using traditional investment casting typically includes steps of: machining of dies for the outer wax structure and for ceramic cores 101, molding and firing the ceramic cores 102, molding a wax pattern with ceramic core 103, wax assembly prep 104, dipping the wax assembly in ceramic slurry 105, drying the ceramic slurry to provide a shell 106, dewaxing the shell 107, casting and leaching 108, and drilling cooling holes 109.

In the abovementioned process, a precision ceramic core 200 is manufactured to conform to the serpentine cooling passages desired inside the turbine blade. A precision die or mold is also created which defines the precise 3-D external surface of the turbine blade including its airfoil, platform, and integral dovetail. The ceramic core 200 is assembled inside two die halves which form a space or void therebetween that define the resulting metal portions of the blade. A relatively rigid wax and/or plastic is injected into the assembled dies to fill the void and surround the ceramic core 200, at which point the ceramic core 200 is encapsulated within the wax. The two die halves are split apart and removed to expose and remove the rigid wax and/or plastic that has the precise configuration of the desired blade formed of a molded wax 211. The molded wax blade 211 with encapsulated ceramic core 200 is then attached to a wax tree structure 212. The wax tree structure 212 is formed of a paraffin wax or any wax that is less rigid than the wax used to form the molded wax blade 211. Because the wax of the wax tree 212 will ultimately define a flowpath for molten metal into the ceramic mold, the dimensional accuracy of the outer surface of the wax used to form the tree structure 212 is less crucial. Thus, a softer wax is generally used to form the individual paths of the wax tree 212 than for the precisely molded wax blade 211 of the desired wax blade. The wax blade 211 requires pins 205 for holding the core in place. The tree structure 212 may include a funnel shaped portion 214 for adding molten metal to the mold. As shown in FIGS. 2-4, the tree structure 212 also includes a ceramic filter 213 for filtration of molten metal in the casting operation.

Ceramic filters generally known in the art include ceramic foam filters (CFF) like the ceramic filter 213 as shown in FIGS. 2-3. These filters are formed by impregnating reticulated polyurethane foam with ceramic slip, removing the excess slip by squeezing the foam, and then drying and firing the body forming a CFF. Other known ceramic filters include symmetric filters. More recently, ceramic filters have been made using various additive technologies. For example, U.S. Patent Application Pub. No. 2016/0038866 A1 entitled "ceramic filters" describes an additively manufactured ceramic filter. Another example is "Advanced Filtration to Improve Single Crystal Casting Yield—Mikro Systems," available at the National Energy Technology Laboratory (NETL) website. These filters are sold as stand-alone filters that may be incorporated in the wax tree 212 as shown in FIG. 2, and then incorporated into the ceramic mold as shown in FIG. 3.

After wax injection and the attachment of wax passageways 212 which form the wax tree structure, the entire wax tree structure 212, ceramic filter 213, and wax turbine blade 211 is then coated with a ceramic material to form a ceramic shell 206, 204 as shown in FIGS. 3 and 4. Then, the wax is melted and removed from the ceramic shell 206, leaving a corresponding void or space 201, 207 between the ceramic shell 206 and the internal ceramic core 200. Further, once the wax tree structure 212 is melted, the ceramic shell 204 defines a flow path in fluid communication with the void or space 201, 207. After the wax is removed, the ceramic core is held in place by pins 205. As shown in FIG. 4, molten superalloy metal 208 is then poured into the shell 206 through the flow path defined by a portion of the ceramic shell 204. The molten superalloy may include any one of stainless steel, aluminum, titanium, INCONEL® 625, INCONEL®, INCONEL® 188, cobalt chrome, nickel, among other metal materials or any alloy; such as nickel (Ni) superalloys, and/or Ni superalloy single crystal alloys. For example, the above alloys may include materials with trade names, Haynes 188®, Haynes 625®, Super Alloy INCONEL® 625™, Chronin® 625, Altemp® 625, Nickelvac® 625, Nicrofer® 6020, INCONEL® 188, and any other material having material properties attractive for the formation of components using the above-mentioned techniques. The molten superalloy metal 208 fills the voids 201, 207 and encapsulates the ceramic core 200 contained in the shell 206. The molten metal 208 is cooled and solidifies, and then the external ceramic shell 206 and internal ceramic core 202 are suitably removed leaving behind the desired metallic turbine blade in which the internal cooling passages are found. In order to provide a pathway for removing the ceramic core material via a leaching process, a ball chute (not shown) and the tip pins (e.g. reference 505 in FIG. 11) must be provided. Generally, after the leaching process, a ball chute and tip pin holes within the turbine blade must be subsequently brazed shut.

The cast turbine blade 208 typically undergoes additional post-casting modifications, such as drilling of suitable rows of film cooling holes through the sidewalls of the airfoil as desired for providing outlets for the internally channeled cooling air which then forms a protective cooling air film or blanket (generally referred to as film cooling) over the external surface of the airfoil during operation in the gas turbine engine. After the turbine blade is removed from the ceramic mold, pins 205 which held the ceramic core 200 form a passageway that is later brazed shut to provide the desired pathway of air through the internal voids of the cast turbine blade. However, these post-casting modifications are limited and given the ever increasing complexity of turbine engines and the recognized efficiency improvements provided by certain cooling circuits inside turbine blades, more complicated and intricate internal geometries are required. While investment casting is capable of manufacturing these parts, positional precision and intricate internal geometries become more complex to manufacture using these conventional manufacturing processes and thus increase manufacturing time and expense significantly. Accordingly, it was desirable to provide an improved casting method for three dimensional components having intricate internal voids and cooling circuits.

Additive manufacturing techniques, and 3-D printing allowed molds to be manufactured without the toolpath and/or molding limitations associated with subtractive manufacturing. For example, methods for using 3-D printing to produce a ceramic core-shell mold are described in U.S. Pat. No. 8,851,151 assigned to Rolls-Royce Corporation. The methods for making the molds include powder bed ceramic processes such as disclosed U.S. Pat. No. 5,387,380 assigned to Massachusetts Institute of Technology, and selective laser activation (SLA) such as disclosed in U.S. Pat. No. 5,256,340 assigned to 3D Systems, Inc. The ceramic core-shell molds according to the '151 patent are significantly limited by the printing resolution capabilities of these processes. As shown in FIG. 5, core portion 301 and shell portion 302 of integrated core-shell mold 300 is held together via a series of tie structures 303 provided at the bottom edge of the mold 300. Cooling passages are proposed in the '151 patent that include staggered vertical cavities joined by short cylinders, the length of which is nearly the same as its diameter. A superalloy turbine blade is then formed in the core-shell mold using known techniques disclosed in the '151 patent, and incorporated herein by reference. After a turbine blade is cast in one of these core-shell molds, the mold is removed to reveal a cast superalloy turbine blade.

There still remains the need to prepare ceramic core-shell molds produced using higher resolution methods that are capable of providing fine detail cast features in the end-product of the casting process such as fine resolution capability necessary to print filaments extending between the core and shell portion of the mold of sufficiently small size and quantity to result in effusion cooling holes in the finished turbine blade or stator vane, for example. In the case of earlier powder bed processes, such as disclosed in U.S. Pat. No. 5,387,380 assigned to Massachusetts Institute of Technology, the action of the powder bed recoater arm precludes formation of sufficiently fine filaments extending between the core and shell to provide an effusion cooling hole pattern in the cast part. Other known techniques such as selective laser activation (SLA) such as disclosed in U.S. Pat. No. 5,256,340 assigned to 3D Systems, Inc. that employ a top-down irradiation technique may be utilized in producing an integrated core-shell mold in accordance with the present invention. However, the available printing resolution of these systems significantly limits the ability to make filaments of sufficiently small size to serve as effective cooling holes in the cast final product.

While the above-mentioned processes can be used to form integrated core-shell mold, it is advantageous to manufacture a core-shell mold using direct light processing (DLP). DLP differs from the above discussed powder bed and SLA processes in that the light curing of the polymer occurs through a window at the bottom of a resin tank that projects light upon a build platform that is raised as the process is conducted. With DLP an entire layer of cured polymer is produced simultaneously, and the need to scan a pattern using a laser is eliminated. Further, the polymerization occurs between the underlying window and the last cured layer of the object being built. The underlying window provides support allowing thin filaments of material to be produced without the need for a separate support structure. In other words, producing a thin filament of material bridging two portions of the build object is difficult and was typically avoided in the prior art. For example, the '151 patent discussed above in the background section of this application used vertical plate structures connected with short cylinders, the length of which was on the order of their diameter. Staggered vertical cavities are necessitated by the fact that the powder bed and SLA techniques disclosed in the '151 patent require vertically supported ceramic structures and the techniques are incapable of reliably producing filaments. For example, round cooling holes generally have a diameter of less than 2 mm corresponding to a cooling hole area below 3.2 mm$^2$. Production of a hole of such dimensions requires a resolution far below the size of the actual hole given the need to produce the hole from several voxels. This resolution is simply not available in a powder bed process. Similarly, stereolithography is limited in its ability to produce such filaments due to lack of support and resolution problems associated with laser scattering. But the fact that DLP exposes the entire length of the filament and supports it between the window and the build plate enables producing sufficiently thin filaments spanning the entire length between the core and shell to form a ceramic object having the desired cooling hole pattern. Although powder bed and SLA may be used to produce filaments, their ability to produce sufficiently fine filaments as discussed above is limited.

Further, in employing the above-mentioned DLP method of manufacturing a core-shell of the embodiment described above, various difficulties arise in integrating the use of a core-shell mold into an efficient manufacturing process. For example, the time required to form a core-shell mold having sufficient dimensional stability (e.g., wall thickness) using a DLP process may delay the manufacturing process and require the use of excess material. Further, in the molding process it may be desired to efficiently produce portions of a mold that do not require the same dimensional accuracy as is required in portions of the core-shell mold itself. For example, it may be desirable to produce passages for directing the flow of molten superalloy into a single or plurality of core-shell molds. Further, when forming a core-shell mold using a DLP process it may be desirable to improve the ease of removing the core-shell once the casting is completed. For example, the knockout process may be improved by producing a thinner core-shell, to reduce the likeliness that the cast product is damaged upon removal of the core-shell. It may also be desirable to control the thermal conductivity of the core-shell mold to control crystal growth and/or tailor the material properties of the cast component.

BRIEF DESCRIPTION OF THE INVENTION

In one embodiment, the invention relates to a method of fabricating a ceramic casting mold. The foregoing and/or other aspects of the present invention may be achieved by a method of fabricating a ceramic casting mold including connecting at least one wax gate component to a ceramic core-shell mold, the ceramic core-shell mold including a core portion and a shell portion and at least one first cavity between the core portion and the shell portion. The method further includes coating at least a portion of the ceramic core-shell mold and the wax gate component with a second ceramic material and removing the wax gate component to form at least a second cavity in fluid communication with the first cavity.

The core-shell mold may be fabricated through the use of additive manufacturing techniques. More specifically the method may comprise making a ceramic mold having a core and shell. The method having steps of (a) contacting a cured portion of a workpiece with a liquid ceramic photopolymer; (b) irradiating a portion of the liquid ceramic photopolymer adjacent to the cured portion through a window contacting the liquid ceramic photopolymer; (c) removing the workpiece from the uncured liquid ceramic photopolymer; and (d) repeating steps (a)-(c) until a ceramic mold is formed. After step (d), the process may further include a step (e) of pouring a liquid metal into a casting mold and solidifying the liquid metal to form the cast component. After step (e), the process may further include a step (f) comprising removing the mold from the cast component, and this step preferably involves a combination of mechanical force and chemical leaching in an alkaline bath. By adding a second ceramic material on at least a portion of the ceramic mold in step (d), at least one of the following advantages can be achieved: improvement of the structural integrity of the mold; reduction in build time of the core and shell; reduction in materials required to form the mold; ability to tailor the material properties of the mold; ability to tailor the thermal properties of the mold; and/or improvement in casting efficiency and/or production.

In another aspect, the invention relates to a method of preparing a cast component. The method includes steps of pouring a liquid metal into a ceramic casting mold and solidifying the liquid metal to form the cast component, the ceramic casting mold comprising a core portion and a first ceramic shell portion and a second ceramic shell portion surrounding at least a portion of the first ceramic shell portion, wherein the ceramic casting mold has at least one cavity between the core portion and the first ceramic shell portion, the cavity adapted to define the shape of the cast component upon casting and removal of the ceramic mold. Further, the ceramic casting mold may include a plurality of filaments joining the core portion and the first ceramic shell portion where each filament spans between the core and the first ceramic shell, the filaments adapted to define a plurality of holes in the cast component upon removal of the mold. The invention may further comprise the step of removing the ceramic casting mold from the cast component by leaching at least a portion of the ceramic core through the holes in the cast component provided by the filaments.

In one embodiment, the invention relates to a method for fabricating a ceramic mold, comprising: (a) contacting a cured portion of a workpiece with a liquid ceramic photopolymer; (b) irradiating a portion of the liquid ceramic photopolymer adjacent to the cured portion through a window contacting the liquid ceramic photopolymer; (c) removing the workpiece from the uncured liquid ceramic photopolymer; and (d) repeating steps (a)-(c) until a first ceramic mold formed of a first ceramic material is formed, and (e) adding a second ceramic material on at least a portion of the first ceramic mold to form an outer mold. The outer ceramic mold encasing the first ceramic mold and the filter portion; the first ceramic mold comprising a core portion and a shell portion with at least one cavity between the core portion and the shell portion, the cavity adapted to define the shape of a cast component upon casting and removal of the ceramic mold and the filter portion oriented in the path of molten metal flowing into the cavity of the mold. The process further includes, after step (e), a step (f) comprising pouring a liquid metal into a casting mold and solidifying the liquid metal to form the cast component. After step (f), a step (g) including removing the mold from the cast component may be performed.

In another embodiment, the invention relates to a method of preparing a cast component using an additively manufactured mold. The method includes using the abovementioned steps to form a first ceramic shell portion of a partial ceramic mold formed of a first ceramic material and optionally forming a first ceramic core portion, the optional first ceramic core portion and the first ceramic shell portion adapted to interface with at least an optional second ceramic core portion and a second ceramic shell portion to form at least a two piece ceramic mold comprising a cavity between the first and/or second ceramic core portions and the first and second shell portions, the cavity adapted to define a cast component upon casting and removal of the ceramic mold. The first and second ceramic shell portions are then assembled via the interface and a third ceramic shell is formed on at least a portion of the first and/or second ceramic shell portion. A liquid metal is provided so as to fill the cavity. The ceramic is subsequently removed and a portion of the ceramic core is leached through at least one hole in the cast component.

In another embodiment, the invention relates to a method of forming a mold using any of the abovementioned techniques, wherein the outer ceramic shell portions are provided so as to increase or decrease the thermal conductivity of at least a portion of the mold. Further, the outer ceramic shell may be provided in such a way as to provide variable thermal conductivity to the mold. For example, a thickness of the mold may be varied, porosity of the outer layer of the mold may be varied, the material properties of various portions of the ceramic mold may be varied, and/or a combination of the abovementioned variables may be altered to control the thermal properties of the mold. Further, the thermal properties of the mold may be tailored to control crystalline growth or directionality of the cast component to be produced in the mold.

In another embodiment, a method of fabricating a ceramic casting mold is disclosed. The method comprises steps of: covering or plugging an opening in a ceramic core-shell mold with a cover or a plug, the ceramic core-shell mold comprising a core portion and a shell portion and at least one first cavity between the core portion and the shell portion; and coating at least a portion of the ceramic core-shell mold and the cover or plug with a second ceramic material. In another aspect, a method of forming a cast component is disclosed. The method comprises steps of: covering or plugging an opening in a ceramic core-shell mold with a cover or a plug, wherein the core-shell mold includes at least a first cavity between a ceramic core and a ceramic shell; coating at least a portion of the ceramic core-shell mold and the cover or plug with a ceramic outer shell formed of a second ceramic material; and pouring a molten metal into the first cavity.

In another embodiment, a ceramic casting mold is disclosed. The ceramic casting mold comprises: a ceramic core portion, a first ceramic shell portion, a ceramic cover, and a second ceramic shell portion at least partially covering the first ceramic shell portion and the ceramic cover. The ceramic casting mold further comprises; at least one cavity between the ceramic core portion and the first ceramic shell portion, the cavity adapted to define the shape of the cast component upon casting and removal of the ceramic casting mold. The mold further comprises a plurality of filaments joining the ceramic core portion and the first ceramic shell portion where each filament spans between the ceramic core and first ceramic shell portion, the filaments adapted to define a plurality of holes providing fluid communication between a cavity within the cast component defined by the ceramic core portion and an outer surface of the cast component upon removal of the mold.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
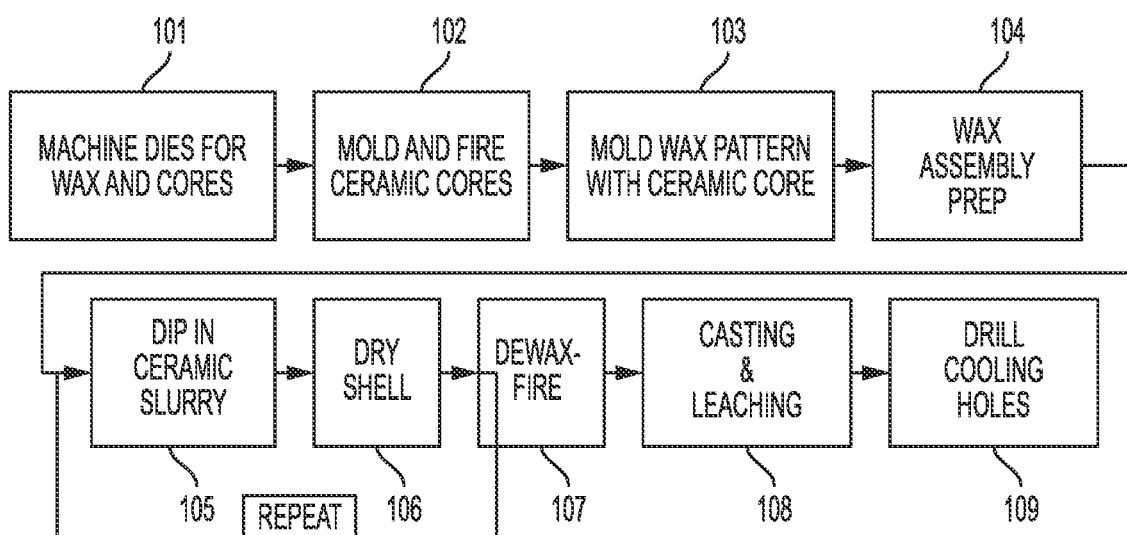
FIG. 1 is a flow diagram showing the steps for conventional investment casting.
Figure 2:
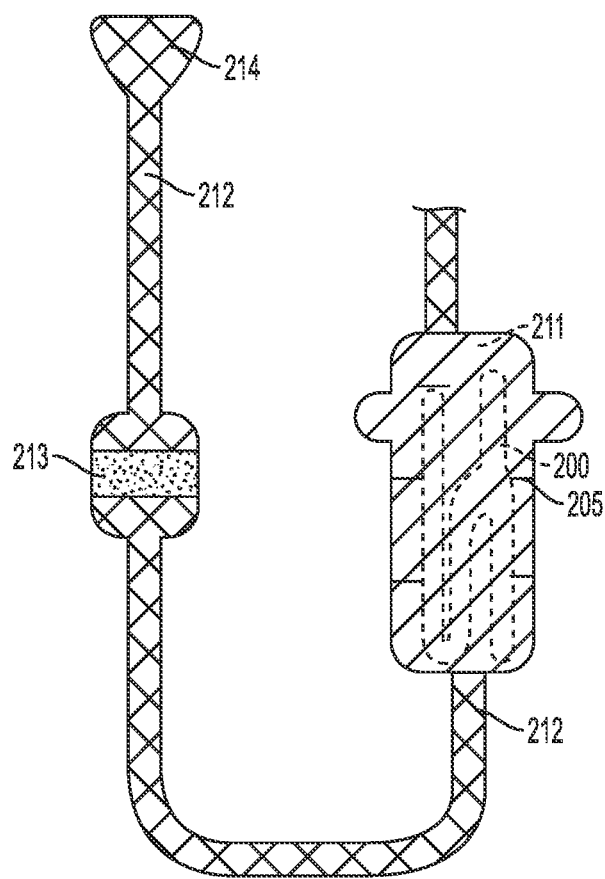
FIG. 2 is a schematic diagram showing a conventional wax pattern attached to a wax tree structure for investment casting of a turbine blade.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

For example, the present invention provides a preferred method for making cast metal parts, and preferably those cast metal parts used in the manufacture of jet aircraft engines. Specifically, the production of single crystal, nickel-based superalloy cast parts such as turbine blades, vanes, combustors, fuel nozzles, and shroud components can be advantageously produced in accordance with this invention. However, other cast metal components may be prepared using the techniques and integrated ceramic molds of the present invention.

It is recognized that prior processes known for making integrated core-shell molds lacked the fine resolution capability necessary to print filaments extending between the core and shell portion of the mold of sufficiently small size and quantity to result in effusion cooling holes in the finished turbine blade. Thus a core-shell mold may be manufactured using direct light processing (DLP). DLP differs from more traditional powder bed and SLA processes in that the light curing of the polymer occurs through a window at the bottom of a resin tank that projects light upon a build platform that is raised as the process is conducted. With DLP an entire layer of cured polymer is produced simultaneously, and the need to scan a pattern using a laser is eliminated. Further, the polymerization occurs between the underlying window and the last cured layer of the object being built. The underlying window provides support allowing thin filaments of material to be produced without the need for a separate support structure. In other words, producing a thin filament of material bridging two portions of the build object is difficult and was typically avoided in the prior art. For example, the '151 patent discussed above in the background section of this application used vertical plate structures connected with short cylinders, the length of which was on the order of their diameter. Staggered vertical cavities are necessitated by the fact that the powder bed and SLA techniques disclosed in the '151 patent require vertically supported ceramic structures and the techniques are incapable of reliably producing filaments. For example, round cooling holes generally have a diameter of less than 2 mm corresponding to a cooling hole area below 3.2 $mm^2$. Production of a hole of such dimensions requires a resolution far below the size of the actual hole given the need to produce the hole from several voxels. This resolution is simply not available in a powder bed process. Similarly, stereolithography is limited in its ability to produce such filaments due to lack of support and resolution problems associated with laser scattering. But the fact that DLP exposes the entire length of the filament and supports it between the window and the build plate, enables producing sufficiently thin filaments spanning the entire length between the core and shell to form a ceramic object having the desired cooling hole pattern. Although powder bed and SLA may be used to produce filaments, their ability to produce sufficiently fine filaments as discussed above is limited.

One suitable DLP process is disclosed in U.S. Pat. No. 9,079,357 assigned to Ivoclar Vivadent AG and Technische Universitat Wien, as well as WO 2010/045950 A1 and US 2011310370, each of which are hereby incorporated by reference and discussed below with reference to FIGS. 6-10. In accordance with an exemplary embodiment of the present invention with reference to FIGS. 6-10, for example, an apparatus includes a tank 404 having at least one translucent bottom 406 covering at least a portion of an exposure unit 410. The exposure unit 410 may include, for example, a light source and modulator with which the intensity can be adjusted position-selectively under the control of a control unit, in order to produce an exposure field on the tank bottom 406 with the geometry desired for the layer currently to be formed. As an alternative, a laser may be used in the exposure unit 410, the light beam of which successively scans the exposure field with the desired intensity pattern by means of a mobile mirror, which is controlled by a control unit.

Opposite the exposure unit 410, a production platform 412 is provided above the tank 404; it is supported by a lifting mechanism (not shown) so that it is held in a height-adjustable way over the tank bottom 406 in the region above the exposure unit 410. The production platform 412 may likewise be transparent or translucent in order that light can be shone in by a further exposure unit, for example, above the production platform 412 in such a way that, at least when forming the first layer on the lower side of the production platform 412, it can also be exposed from above so that the layer cured first on the production platform adheres thereto with even greater reliability.

The tank 404 contains a filling of highly viscous photo-polymerizable material 420. The material level of the filling is much higher than the thickness of the layers which are intended to be defined for position-selective exposure. In order to define a layer of photopolymerizable material, the following procedure is adopted. The production platform 412 is lowered by the lifting mechanism in a controlled way so that (before the first exposure step) its lower side is immersed in the filling of photopolymerizable material 420 and approaches the tank bottom 406 to such an extent that precisely the desired layer thickness A (see FIG. 7) remains between the lower side of the production platform 412 and the tank bottom 406. During this immersion process, photopolymerizable material is displaced from the gap between the lower side of the production platform 412 and the tank bottom 406. After the layer thickness A has been set, the desired position-selective layer exposure is carried out for this layer, in order to cure it in the desired shape. Particularly when forming the first layer, exposure from above may also take place through the transparent or translucent production platform 412, so that reliable and complete curing takes place particularly in the contact region between the lower side of the production platform 412 and the photopolymerizable material, and therefore good adhesion of the first layer to the production platform 412 is ensured. After the layer has been formed, the production platform 412 is raised again by means of the lifting mechanism.

These steps are subsequently repeated several times, the distance from the lower side of the layer 422 formed last to the tank bottom 406 respectively being set to the desired layer thickness A, and the next layer thereupon being cured position-selectively in the desired way.

Figure 6:
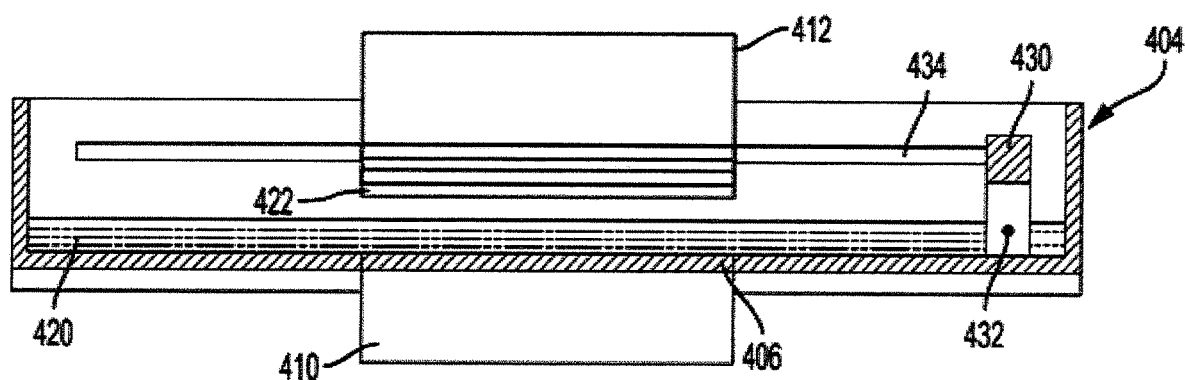
FIGS. 6-9 show schematic lateral sectional views of a device for carrying out successive phases of the method sequence for direct light processing (DLP)
Figure 7:
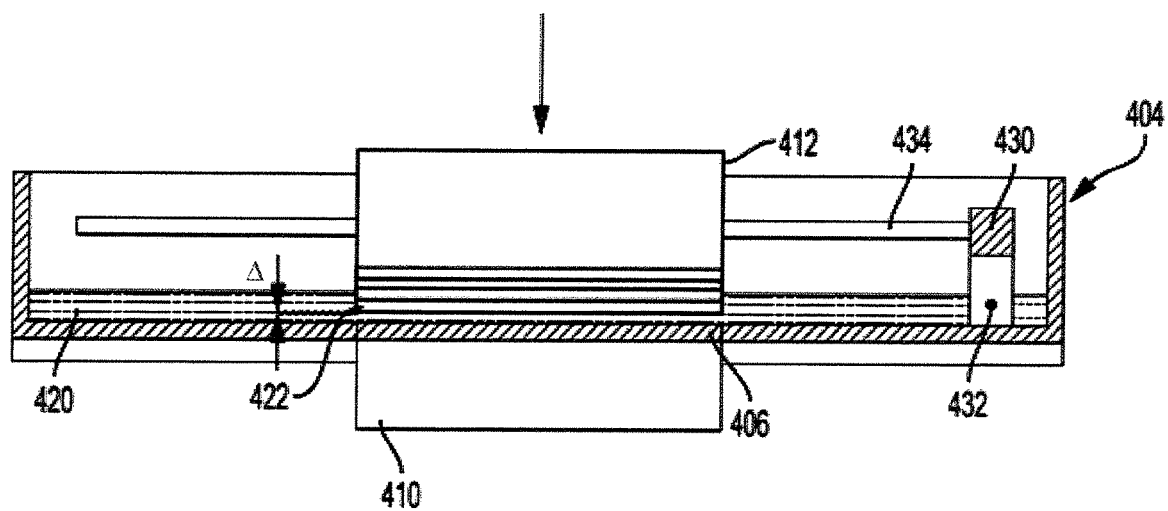

After the production platform 412 has been raised following an exposure step, there is a material deficit in the exposed region as indicated in FIG. 6. This is because after curing the layer set with the thickness A, the material of this layer is cured and raised with the production platform 412 and the part of the shaped body already formed thereon. The photopolymerizable material therefore missing between the lower side of the already formed shaped body part and the tank bottom 406 must be filled from the filling of photopolymerizable material 420 from the region surrounding the exposed region. Owing to the high viscosity of the material, however, it does not flow by itself back into the exposed region between the lower side of the shaped body part and the tank bottom, so that material depressions or "holes" can remain here.

Figure 8:
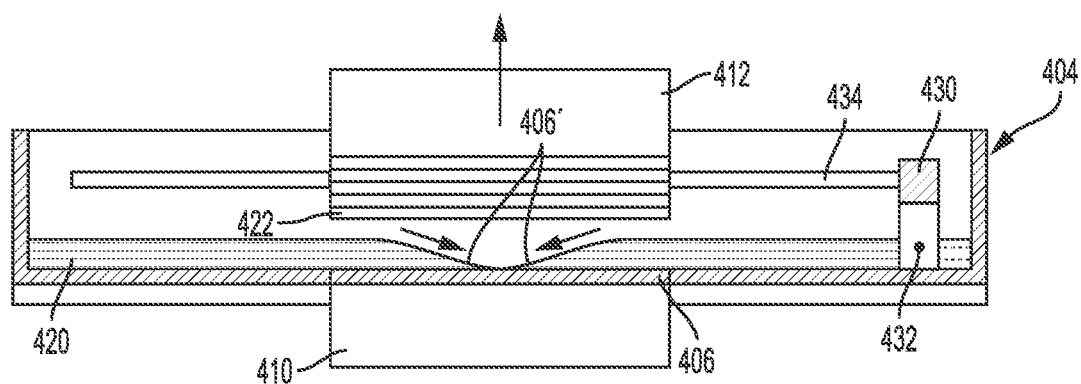
Figure 9:
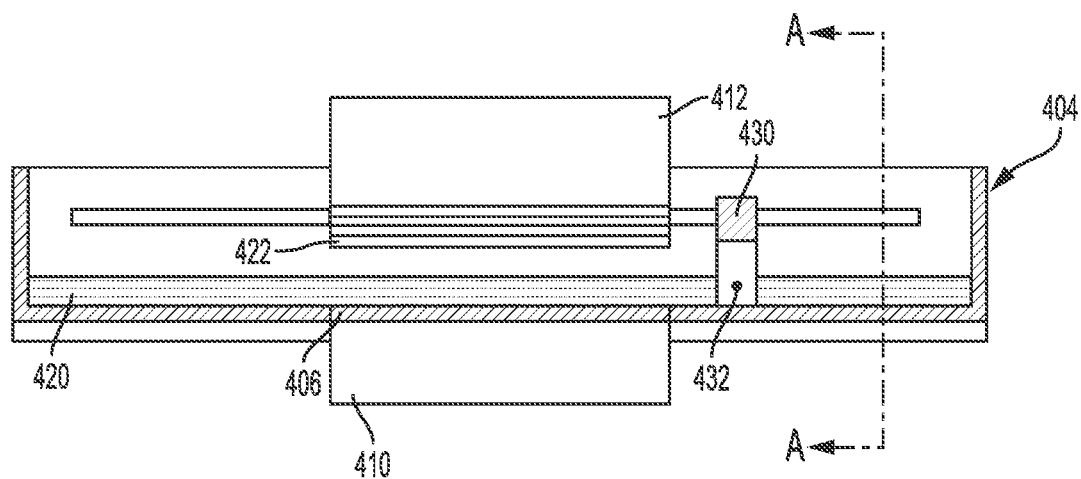
Figure 10:
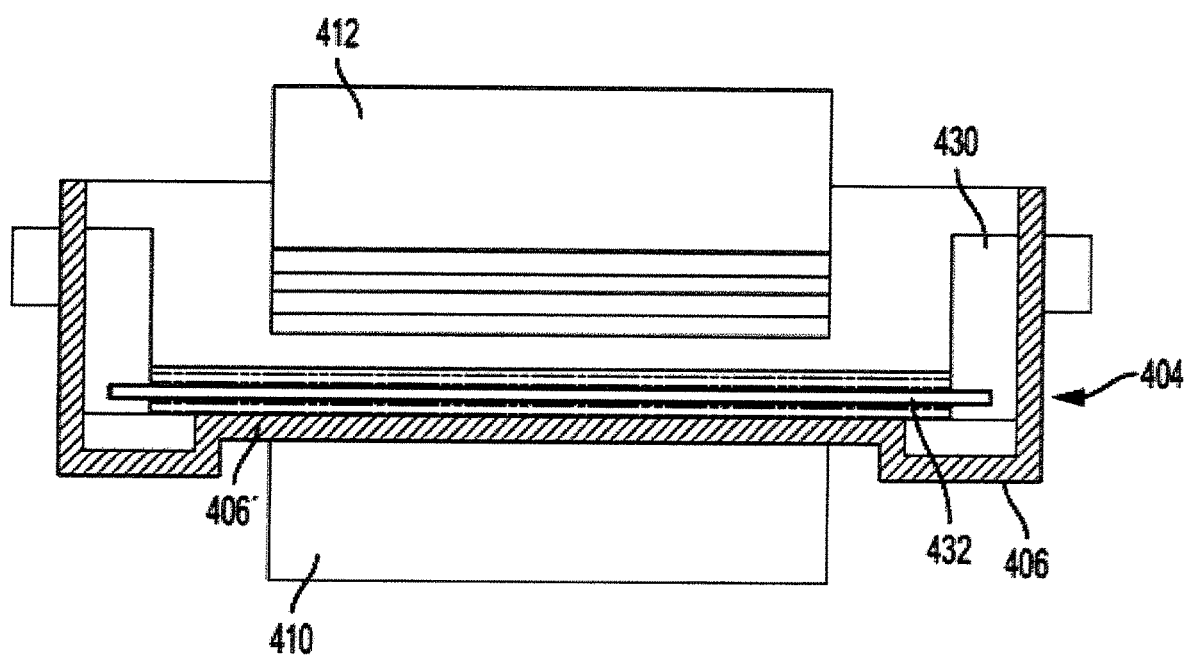
FIG. 10 shows a schematic sectional view along the line A-A of FIG. 9.

In order to replenish the exposure region with photopolymerizable material, an elongate mixing element 432 is moved through the filling of photopolymerizable material 420 in the tank 404. In the exemplary embodiment represented in FIGS. 6 to 8, the mixing element 432 includes, for example, an elongate wire (not shown) which is tensioned between support arms 430 mounted movably on the side walls of the tank 404. The support arms 430 may be mounted movably in guide slots 434 in the side walls of the tank 404, so that the wire tensioned between the support arms 430 can be moved relative to the tank 404, parallel to the tank bottom 406, by moving the support arms 430 in the guide slots 434. The elongate mixing element 432 has dimensions and its movement is guided relative to the tank bottom 406, such that the upper edge of the elongate mixing element 432 remains above the material level of the filling of photopolymerizable material 420 in the tank outside the exposed region. As can be seen in the sectional view of FIG. 8, the mixing element 432 is below the material level in the tank over the entire length of the wire, and only the support arms 430 protrude beyond the material level in the tank. The effect of arranging the elongate mixing element 432 below the material level in the tank 404 is not that the elongate mixing element 432 substantially moves material in front of it during its movement relative to the tank through the exposed region, but rather this material flows over the mixing element 432 while executing a slight upward movement. The movement of the mixing element 432 from the position shown in FIG. 8 to, for example, a new position in the direction indicated by the arrow A, is shown in FIG. 9. It has been found that by this type of action on the photopolymerizable material in the tank, the material is effectively stimulated to flow back into the material-depleted exposed region between the production platform 412 and the exposure unit 410.

The movement of the elongate mixing element 432 relative to the tank 404 may be carried out by a linear drive which moves the support arms 430 along the guide slots 434 in order to achieve the desired movement of the elongate mixing element 432 through the exposed region between the production platform 412 and the exposure unit 410. As shown in FIG. 8, the tank bottom 406 has recesses 406' on both sides. The support arms 430 project with their lower ends into these recesses 406'. This makes it possible for the elongate mixing element 432 to be held at the height of the tank bottom 406, without interfering with the movement of the lower ends of the support arms 430 through the tank bottom 406.

Other alternative methods of DLP may be used to prepare the integrated core-shell molds of the present invention. For example, the tank may be positioned on a rotatable platform. When the workpiece is withdrawn from the viscous polymer between successive build steps, the tank may be rotated relative to the platform and light source to provide a fresh layer of viscous polymer in which to dip the build platform for building the successive layers. Further, the integrated core-shell mold may be formed using any well known method in the art.

Figure 3:
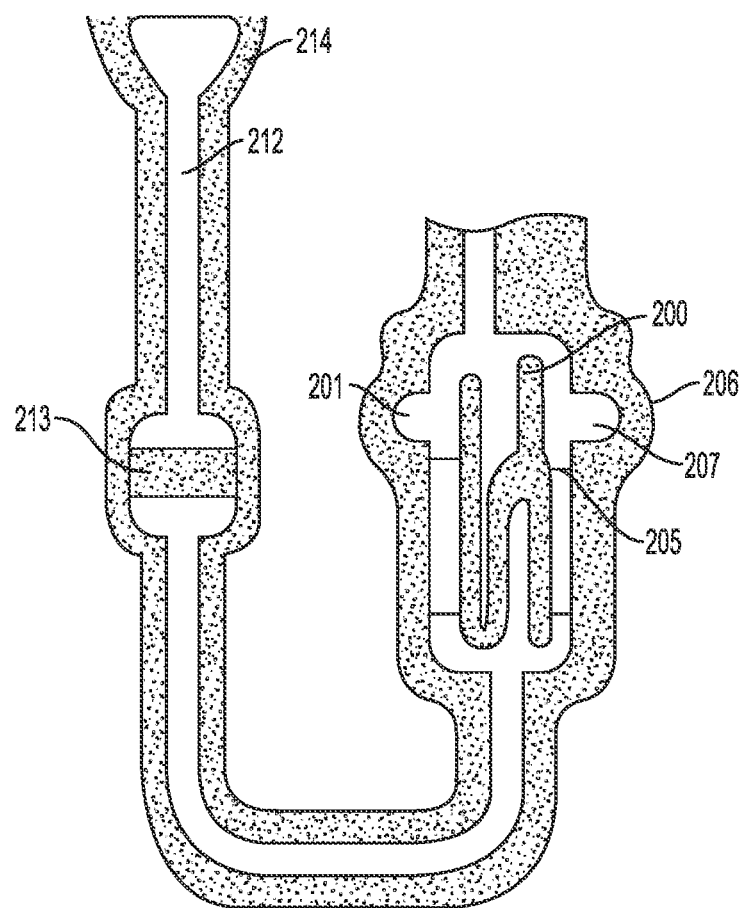
FIG. 3 is a schematic diagram showing the conventional ceramic mold of FIG. 2 after the wax has been removed.
Figure 4:
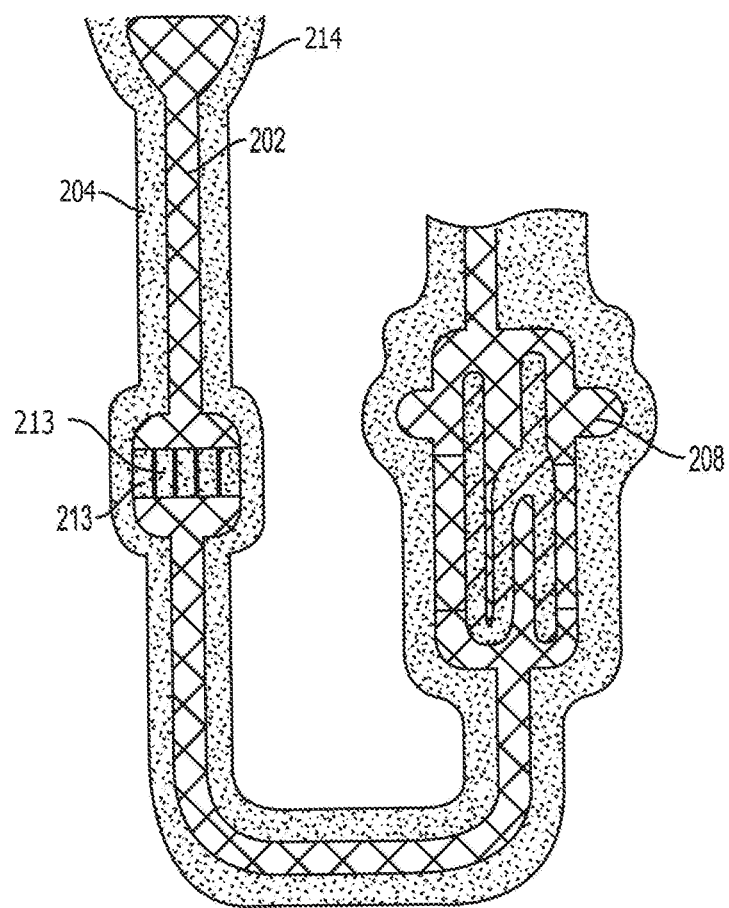
FIG. 4 is a schematic diagram showing the conventional ceramic mold of FIG. 2 after molten metal is poured into the mold.
Figure 5:
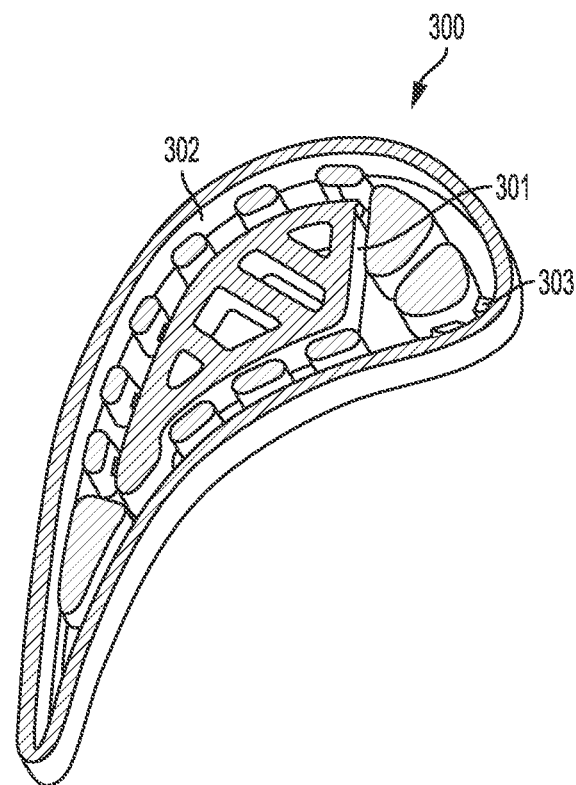
FIG. 5 shows a perspective view of a prior art integrated core-shell mold with ties connecting the core and shell portions.
Figure 11:
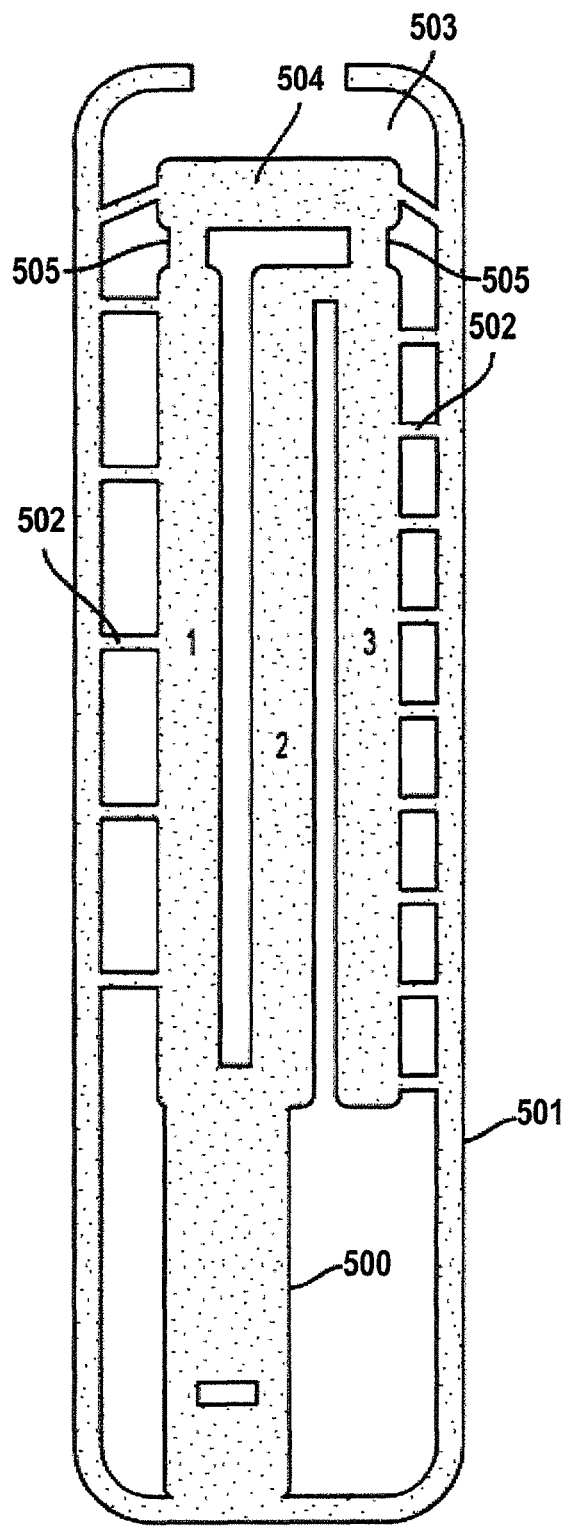
FIG. 11 shows a cross-section view of an integrated core-shell mold with filaments connecting the core and shell portions.

FIG. 11 shows a schematic side view of an integrated core-shell mold with filaments 502 connecting the core 500 and shell portions 501. By printing the ceramic mold using the above DLP printing process, the mold can be made in a way that allows the point of connections between the core and shell to be provided through filaments 502. Once the core-shell mold is printed, it may be subject to a post-heat treatment step to cure the printed ceramic polymer material. The cured ceramic mold may then be used similar to the traditional casting process used in the production of superalloy turbine blades, vanes, or shrouds. Notably because the filaments 502 are provided in a large quantity consistent with formation of a pattern of effusion cooling holes in the surface of a turbine blade or vane, the need for pins shown in FIG. 3, or a ball chute structure may be eliminated. In this embodiment, the tip pins 505 connecting the tip plenum core 504 to the core 500 are retained, and a void 503 exists between the shell portion 501 and the tip plenum core 504. After removal of the ceramic mold, tip holes exist between the core 500 and tip plenum core 504 that may be subsequently brazed shut. However, the tip pins 505 may be eliminated, avoiding the need to braze shut tip holes connecting the core cavity with the tip plenum.

The filaments 502 are preferably cylindrical or oval shape but may also be curved or non-linear. Their exact dimensions may be varied according to a desired film cooling scheme for a particular cast metal part. For example, cooling holes may have a cross sectional area ranging from 0.01 to 2 $mm^2$. In a turbine blade, the cross sectional area may range from 0.01 to 0.15 $mm^2$, more preferably from 0.05 to 0.1 $mm^2$, and most preferably about 0.07 $mm^2$. In the case of a vane or a shroud, the cooling holes may have a cross sectional area ranging from 0.05 to 0.2 $mm^2$, more preferably 0.1 to 0.18 $mm^2$, and most preferably about 0.16 $mm^2$. The spacing of the cooling holes is typically a multiple of the diameter of the cooling holes ranging from 2× to 10× the diameter of the cooling holes, most preferably about 4-7× the diameter of the holes.

The length of the filament 502 is dictated by the thickness of the cast component, e.g., turbine blade or stator vane wall thickness, and the angle at which the cooling hole is disposed relative to the surface of the cast component. The typical lengths range from 0.5 to 5 mm, more preferably between 0.7 to 1 mm, and most preferably about 0.9 mm. The angle at which a cooling hole is disposed is approximately 5 to 35° relative to the surface, more preferably between 10 to 20°, and most preferably approximately 12°. It should be appreciated that the methods of casting according to the present invention allow for formation of cooling holes having a lower angle relative to the surface of the cast component than currently available using conventional machining techniques.

Figure 12:
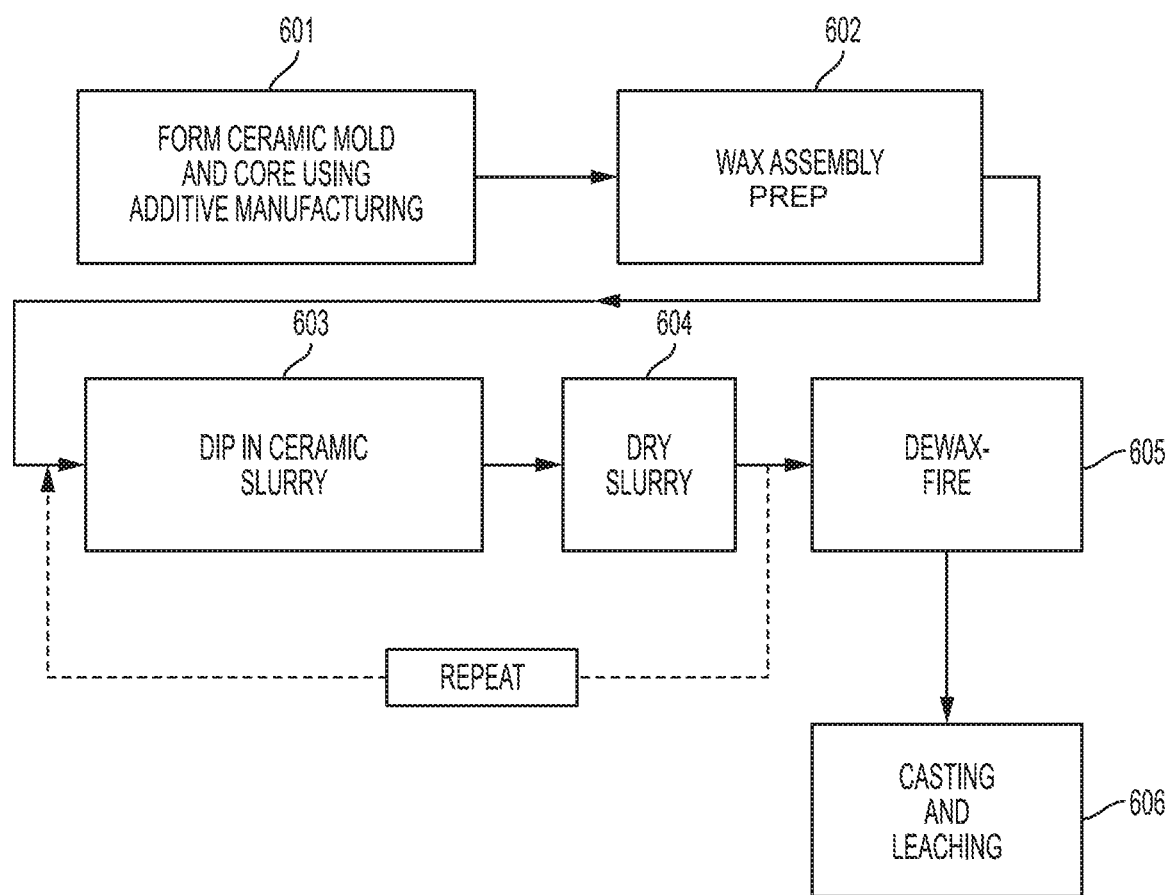
FIG. 12 is a flowchart showing the casting process according to one aspect of the present invention.

As shown in FIG. 12, by employing the DLP process or any other additive manufacturing method to form a ceramic core-shell mold, the manufacturing of a component requires significantly less steps than typical investment casting, as discussed above in the background section. In accordance with an embodiment of the present invention, FIG. 12 shows the steps of forming ceramic mold and core using additive manufacturing 601, prepping the wax assembly 602, dipping the core-shell mold into a ceramic slurry 603, drying the slurry 604, a dewaxing and/or firing process 605, and casting and leaching the ceramic material 606. It may be appreciated that the step of dipping the core-shell mold into the ceramic slurry 603 and drying the slurry 604 may be repeated as shown in FIG. 12. The above-mentioned process of forming a mold may include forming a ceramic mold and core using an DLP process such that the mold is formed as a core-shell structure and is formed of a first photopolymerizable ceramic material. Once a mold is formed, the mold may be joined with several molds and/or may have a wax portion added 602 which will form a flow path for the molten material. The core-shell mold and any additional wax structures added previously may then undergo a dipping or coating process 603 to form a ceramic coating on the outer surface of the shell of the core-shell mold and on the outer surface of any added wax structures. The core-shell mold may then undergo a drying process to the dry the slurry 604. As mentioned above, steps 603 and 604 may be repeated. Then, the core-shell mold and outer ceramic shell may undergo a dewaxing and/or firing process 605 to remove the wax and/or to sinter the ceramic materials which form the mold. It may be appreciated that steps 602, 603, 604, and 605 may be omitted if the ceramic mold and core in step 601 is manufactured to the final mold shape and ready for pouring. The molten superalloy may then be poured into the mold. Once the superalloy has solidified, the core-shell mold and outer shell may be removed through either leaching of the ceramic material and/or through mechanical removal (e.g. knockoff) of the mold.

Figure 13:
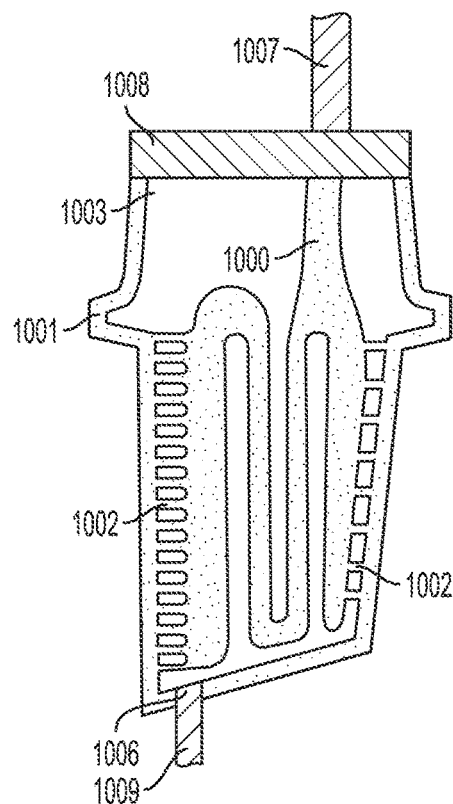
FIG. 13 shows a cross-section side view of an integrated core-shell mold according to an embodiment of the present invention.
Figure 14:
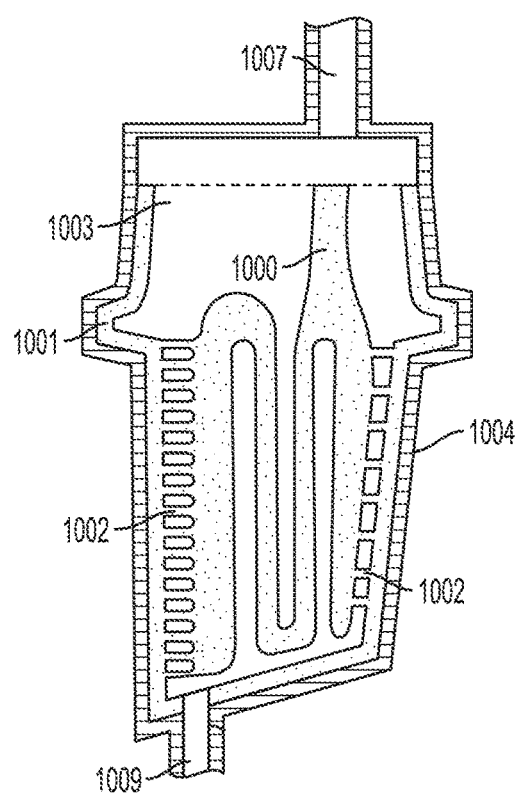
FIG. 14 shows an cross-section side view of an integrated core-shell mold having an outer ceramic layer according to an embodiment of the present invention.

FIG. 13 shows a side view of an integrated core-shell mold according to an embodiment of the present invention. As shown in FIG. 13, the core 1000 is connected to the shell 1001 through several filaments 1002. The core 1000 and the shell 1001 forms the core-shell mold which defines a cavity 1003 for investment casting a turbine blade. The core-shell mold may be connected to a wax gate structure, which may comprise any one of a wax tube 1009, 1007, and/or a wax plug 1008 and/or any selected portion of the final cast article. The core-shell mold may include a passageway 1006 in fluid communication with an inner cavity 1003 of the core-shell mold. The passageway 1006 may have a plurality of wax gate portions 1009, 1007 attached to the core-shell mold. A hole 1006 or a plurality of holes may be integrated with a portion of the cavity 1003. Once the core-shell mold is formed and any wax gate structures are connected to the core-shell mold, an outer ceramic layer 1004 is formed on the outer surface of the core-shell mold and wax gate structures as shown in FIG. 14. The outer ceramic layer 1004 may be formed through dipping of the core-shell mold into a ceramic slurry. The outer ceramic layer 1004 may further be formed as a single layer formed through the dipping of the core-shell mold and/or gate portions into a ceramic slurry, drying the slurry, and dipping the core-shell mold into a either the same ceramic slurry and/or different type of slurry to form an outer shell on the core-shell mold. Further, a refractory grain may be sifted onto the slurry coating between layers. It is noted that other forms of forming a ceramic coating could be used in lieu of or in combination with the dipping process mentioned above. For example, a ceramic and/or other material may be sprayed onto the core-shell. As an example, the above-mentioned slurry may include colloidal silica and a ceramic powder (e.g. $Al_2O_3$, $SiO_2$, $ZrSiO_4$, $ZrO_2$, $Y_2O_3$, AlN, SiC). The above-mentioned grain may be applied between layers and may include ceramic sand (e.g. $Al_2O_3$, $SiO_2$, $ZrSiO_4$, $ZrO_2$, $Y_2O_3$, AlN, SiC) in a mesh of 90-120. Subsequent layers of slurry may be applied and subsequent layers of ceramic sand may be applied in 20-70 mesh and/or 10-30 mesh. Once the necessary outer layer is formed on the core-shell, the mold may be fired to sinter the material; after which, any of the above-mentioned metals (e.g. superalloy) may be poured into the mold.

As shown in FIG. 14, once the outer ceramic layer 1004 is formed, the wax gate portions 1007-1009 may be removed through either melting and/or a chemical removal process. Once the wax gate portions are removed, at least a second passage is formed that is defined by the outer ceramic shell 1004 which was formed on the outer surface of the wax gate portions. The passages corresponding to the wax gate portions 1007-1009 form a cavity which may be in fluid communication with the inner cavity 1003 of the core-shell mold. Further, the ceramic layer 1004 may provide structural qualities to the core-shell mold and may serve as a reinforcement for increasing the durability of the encased core-shell mold and may improve the thermal properties of the mold.

Figure 15:
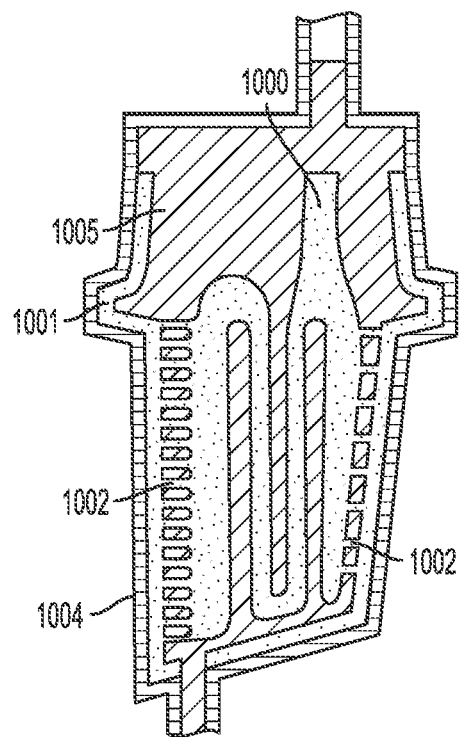
FIG. 15 shows a cross-section side view of a superalloy filled integrated core-shell mold according to an embodiment of the present invention.
Figure 16:
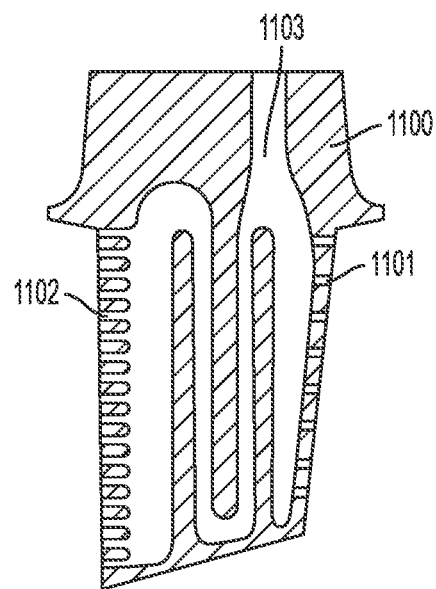
FIG. 16 shows a turbine blade produced using the mold of FIGS. 14 and 15.

FIG. 15 shows the cavity 1003 as shown in FIGS. 13 and 14 filled with a metal 1005, such as a nickel based alloy, e.g., INCONEL®. Once the metal is hardened, the ceramic core and/or shell may be leached out. Upon leaching of the ceramic core-shell, the resulting cast object is a turbine blade having a cooling hole pattern in the surface of the blade. It should be appreciated that although FIGS. 11, 13-18 provide a cross sectional view showing cooling holes at the leading and trailing edge of the turbine blade, that additional cooling holes may be provided where desired including on the sides of the turbine blades or any other location desired. In particular, the present invention may be used to form cooling holes within the casting process in any particular design. In other words, one would be able to produce conventional cooling holes in any pattern where drilling was used previously to form the cooling holes. However, an embodiment of the present invention allows for cooling hole patterns previously unattainable due to the limitations of conventional technologies for creating cooling holes within cast components, e.g., drilling. FIG. 16 shows a cross section of the cast turbine blade 1100 once the ceramic core-shell has been removed through leaching and/or mechanical methods. The turbine blade 1100 includes cooling holes 1101, 1102 connecting the blade surface to the hollow core 1103 of the blade 1100.

Figure 17:
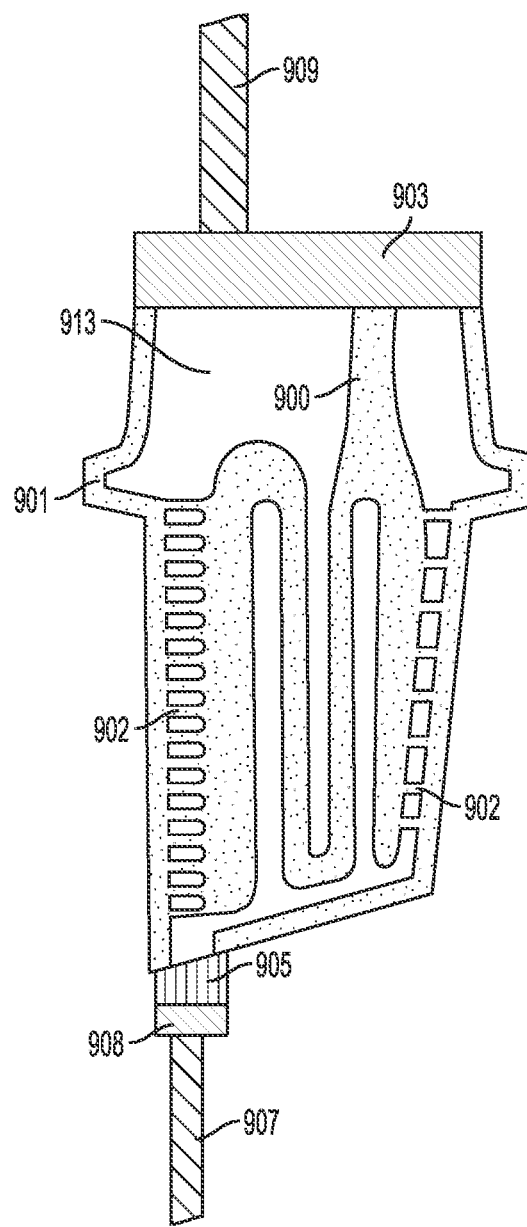
FIG. 17 shows a schematic side view of an integrated core-shell mold with an integrated filter and filaments connecting the core and shell portions of the integrated mold in accordance with another aspect of the present invention.

FIG. 17 shows a schematic side view of an integrated core-shell mold with filaments 902 connecting the core 900 and shell portions 901 of the integrated core-shell mold in accordance with another aspect of the disclosure. Further, the core shell mold may include a cavity 913 at least partially defined by the core 900 and shell 901 portions of the core-shell mold. The cavity 913, may ultimately define the structure of the component once the molten metal is added and solidified. By printing the ceramic mold using the above-mentioned DLP printing process, the mold can be made in a way that allows the connections between the core and shell to be provided through filaments 902 to form cooling holes in the finished component. Further, the filaments may be used to leach the ceramic core 900 from the center of the component once casting is complete. Once the core-shell mold is printed, it may be subject to a post-heat treatment step to cure the printed ceramic polymer material. As shown in FIG. 17, either before or after a curing of the core-shell mold, a sacrificial gate component formed of wax, for example, may be connected to the core-shell mold. The gate component may include a plurality of wax rods or tubes 909, 907, and/or may include a plug 903 and/or an adapter 908 to connect to a filter 905. Further, as discussed below, the filter 905 may be formed using an additive manufacturing technique (e.g., DLP) and may be formed as a single structure with the core-shell mold or may be formed separately and added to the core-shell mold.

Figure 18:
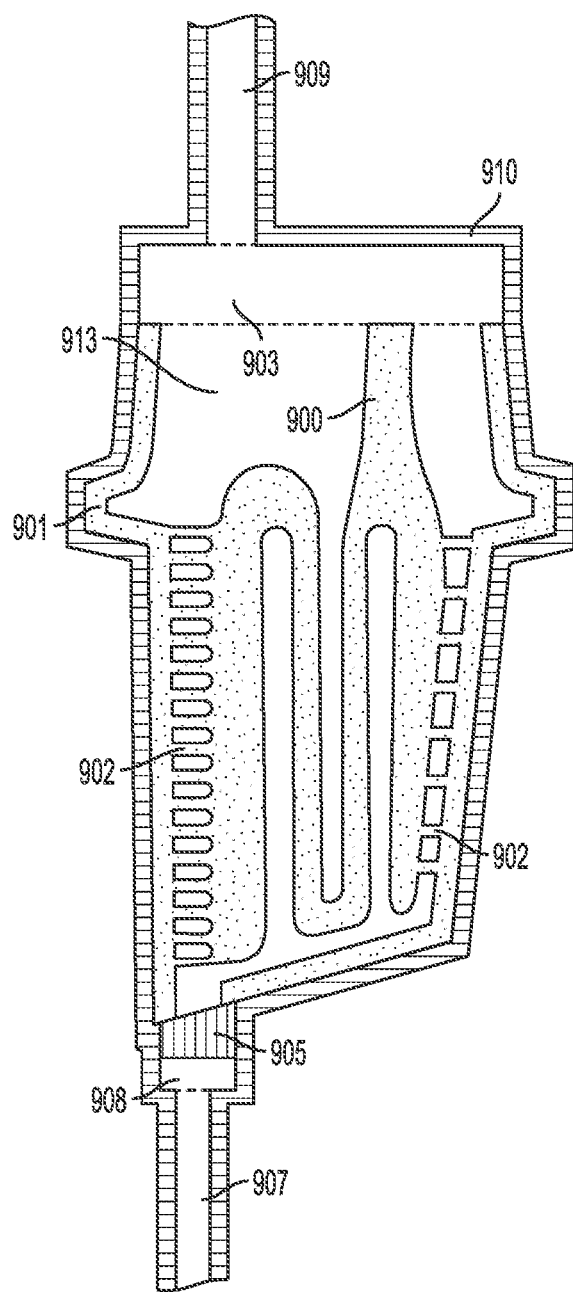
FIG. 18 shows a cross-section side view of FIG. 17 having an outer ceramic layer according to one embodiment of the present invention.

After the gate components are added to the core-shell mold, an outer ceramic layer 910 may be formed on the outer surface of the core-shell mold and/or the gate structures and/or the filter 905. As shown in FIG. 18, the outer ceramic layer 910 may be formed through dipping of the core-shell mold 901, 900, the gate components 907-909 and/or the filter 905 into a ceramic slurry. The outer ceramic layer 910 may further be formed as a single layer formed through the dipping of the core-shell mold into a ceramic slurry, drying the slurry coating on the core-shell, and dipping the core-shell mold into a either the same ceramic slurry and/or different type of slurry to form an outer shell on the core-shell mold. Further, a refractory grain may be sifted or added onto the slurry coating between layers. It is noted that other methods of forming a ceramic coating could be used in lieu of or in combination with the dipping process mentioned above. For example, a ceramic and/or other material may be sprayed onto the core-shell. As an example, the above-mentioned slurry may include colloidal silica and a ceramic powder (e.g. Al2O3, SiO2, ZrSiO4, ZrO2, Y2O3, AlN, SiC). The abovementioned grain may be applied between layers and may include ceramic sand (e.g. Al2O3, SiO2, ZrSiO4, ZrO2, Y2O3, AlN, SiC) in a mesh of 90-120. Subsequent layers of slurry may be applied and subsequent layers of ceramic sand may be applied in 20-70 mesh and/or 10-30 mesh. Once the necessary outer layer is formed on the core-shell, the mold may be fired to sinter the material; after which, any of the above-mentioned metals may be poured into the mold. The cured ceramic mold may then be used similar to the traditional casting process used in the production of turbine blades, stator vanes, shrouds, and/or any other component.

As shown in FIG. 18, once the outer ceramic layer 910 is formed on the outer surface 901 of the core-shell mold, the gate portions 907-909, and/or the filter 905, the gate portions may be removed. The gate portions 907-909 may be removed through melting of the material forming the gate components (e.g. wax) and/or may be removed through a chemical removal process.

As shown in FIGS. 17 and 18, the wax gate component 903 and a filter 905, which may be integrated with the mold, are provided for flowing liquid metal into the integrated mold. An integrated filter 905 is provided within the flowpath for liquid metal as shown in FIGS. 17 and 18. As mentioned above, the filter may be formed as a unitary structure with the core-shell mold or may be attached separately prior to the outer coating 910 being applied to the core-shell mold. It is further noted that the wax gate component 903 may include a wax and/or plastic tube portion attached to the ceramic core-shell 901. Accordingly, when the outer ceramic layer 910 is added to the core-shell and the wax gate component is removed, a passage having an inner surface geometry equivalent to the outer surface geometry of the wax gate component 903 is formed by the outer ceramic layer and thus, it is unnecessary to form the wax gate component 903 via a DLP process. Further, it is noted that the filter 905 may be connected and formed using the above-mentioned DLP process so as to be a single structure with the core-shell mold 901. A wax and or/plastic tube may then be connected to the filter 905 prior to the addition of the outer ceramic layer 910. The wax and/or plastic tube may further be connected to a wax and/or plastic adapter portion 908 provide an interface between the filter and the wax and/or plastic tube.

The ceramic filter 905 as shown in FIGS. 17-18 is adapted for filtration of molten metal as it is poured into the mold. The DLP process described above is particularly suited to provide resolution sufficient to provide porosity for a ceramic filter for filtering molten metal. The particular geometry of the filter used in accordance with an embodiment of the present invention may depend upon the characteristics of the metal to be used and the design requirements of the finished product. The geometry of the conventional ceramic filters may be used. Preferably, the filter has a cylindrical shape where the height of the cylinder is less than the diameter of the filter. The ceramic filter preferably includes an inlet surface and outlet surface and openings providing a pathway for liquid metal to pass from the inlet surface through the filter and then the outlet surface. The openings may preferably include at least 60% to at least about 90% of a total volume of the ceramic filter. More preferably, the openings may include at least 70% to at least about 85% of a total volume of the ceramic filter.

Further, a port (not shown), for example, may also be provided for cleaning the integrated core-shell mold before heat treatment and/or metal addition. After printing the ceramic mold by DLP, there may be uncured resin within the mold portion or filter portion. The port, for example, may be provided to allow a flowpath for solvent used to remove any wax or uncured resin. If desired, several cleaning ports may be provided in the tube portion or core-shell mold portion. It is noted that any method of closing the port may be used. For example, in one aspect the cleaning port is merely a hole in the tube or mold portion that can subsequently be patched with ceramic material prior to curing the mold after the solvent cleaning step is performed.

The filaments 902 may be cylindrical or oval shaped, but may be curved or non-linear. Their exact dimensions may be varied according to a desired film cooling and/or bore cooling scheme for a particular cast metal part. For example, cooling holes may have a cross sectional area ranging from 0.01 to 2 $mm^2$. In a turbine blade, the cross sectional area may range from 0.01 to 0.15 $mm^2$, more preferably from 0.05 to 0.1 $mm^2$, and most preferably about 0.07 $mm^2$. In the case of a vane or shroud, the cooling holes may have a cross sectional area ranging from 0.05 to 0.2 $mm^2$, more preferably 0.1 to 0.18 mm$^2$, and most preferably about 0.16 mm$^2$. The spacing of the cooling holes is typically a multiple of the diameter of the cooling holes ranging from 2× to 10× the diameter of the cooling holes, most preferably about 4-7× the diameter of the holes.

The length of the filament 902 is dictated by the thickness of the cast component, e.g., turbine blade or stator vane wall thickness, and the angle at which the cooling hole is disposed relative to the surface of the cast component. The typical lengths range from 0.5 to 5 mm, more preferably between 0.7 to 1 mm, and most preferably about 0.9 mm. The angle at which a cooling hole is disposed is approximately 5 to 35° relative to the surface, more preferably between 10 to 20°, and most preferably approximately 12°. It should be appreciated that the methods of casting according to the present invention allow for formation of cooling holes having a lower angle relative to the surface of the cast component than currently available using conventional machining techniques.

In accordance with another aspect, filaments may be provided simply to hold the ceramic core 900 in place while metal is poured into the mold. The core shown in FIGS. 17 and 18 may also be formed as a hollow core as an alternative or in combination with a solid core. One advantage of forming a hollow core via the above-mentioned process, is that it reduces the extent of leaching necessary to remove the core after metal casting. In another aspect, for example, both the core and connecting filaments may be hollow allowing rapid leaching of the ceramic mold material after casting.

Upon leaching of the ceramic core-shell, the resulting cast object may be a turbine blade having a cooling hole pattern in the surface of the blade. It should be appreciated that although FIGS. 13-18 provide a cross sectional view showing cooling holes at the leading and trailing edge of the turbine blade, additional cooling holes may be provided where desired including on the sides of the turbine blades or any other location desired. In particular, the present invention may be used to form cooling holes within the casting process in any particular design. In other words, one would be able to produce conventional cooling holes in any pattern where drilling was used previously to form the cooling holes. However, the present invention will allow for cooling hole patterns previously unattainable due to the limitations of conventional technologies for creating cooling holes within cast components, i.e., drilling. As noted above, the filaments may be used to hold the core in place during casting. In that case, the holes in the surface provided by the filaments can be closed using a brazing or equivalent operation.

Figure 19:
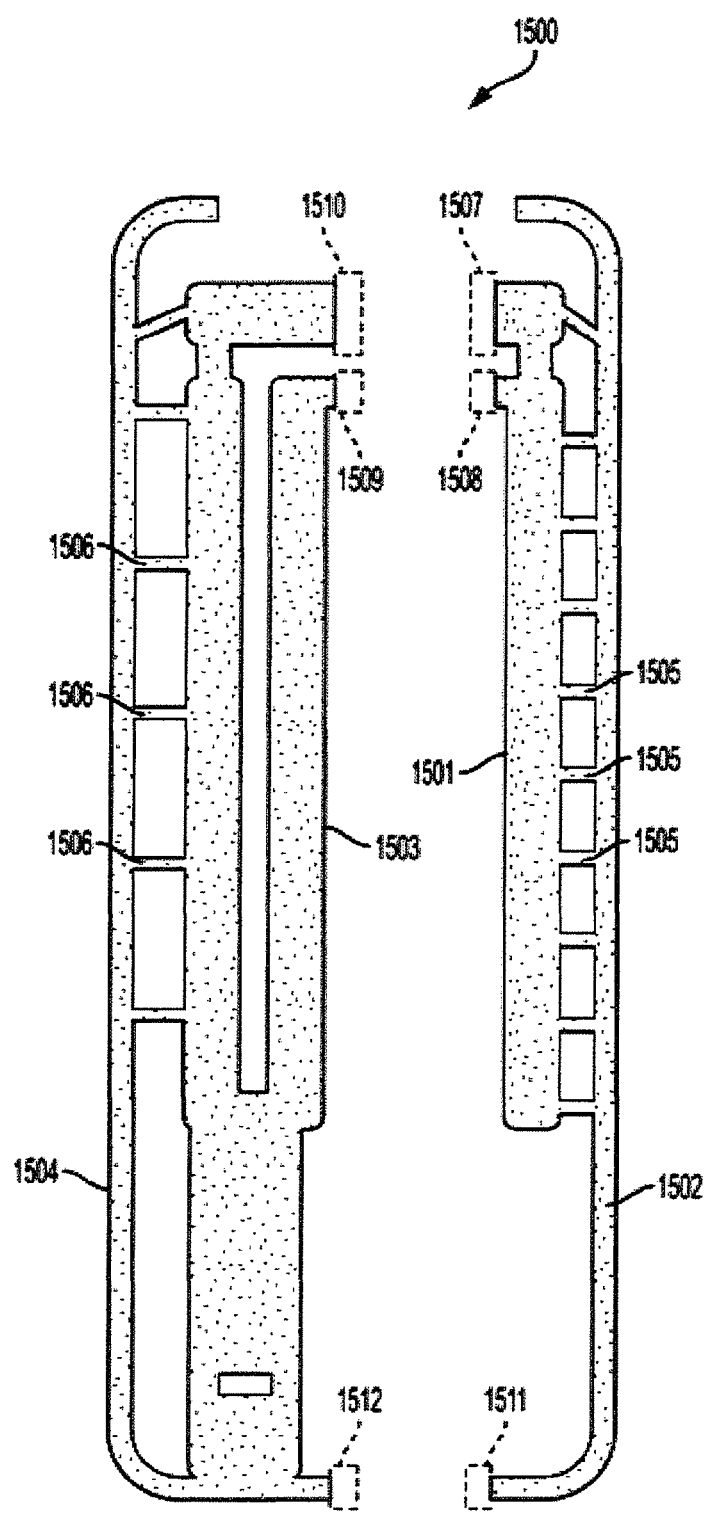
FIG. 19 shows a cross-section side view of a two-part integral core-shell mold including filaments extending from the core to the shell for in accordance with an embodiment of the invention.

FIG. 19 shows a cross-section side view of a two-part integral core-shell mold including filaments extending from the core to the shell in accordance with an embodiment of the invention. As shown in FIG. 19, an example of a two-part core-shell assembly 1500 having a first core portion 1501 with attachment mechanisms (1507, 1508), a first shell portion 1502 with attachment mechanism 1511, a second core portion 1503 with attachment mechanisms (1509, 1510), and a second shell portion 1504 with attachment mechanism 1512. The attachment mechanisms 1507-1508 may further include any structural interface that allows the attachment mechanisms 1507 and 1508 to be joined with the desired accuracy. Examples of possible structural interfaces which are usable with the current disclosure are disclosed in U.S. patent application Ser. No. 15/377,796, titled "MULTI-PIECE INTEGRATED CORE-SHELL STRUCTURE FOR MAKING CAST COMPONENT", and filed Dec. 13, 2016. The disclosures of the above-mentioned application is incorporated herein in the entirety to the extent that it discloses additional aspects of core-shell molds and methods of making that can be used in conjunction with the core-shell molds disclosed herein.

The first core portion 1501 and first shell portion 1502 are linked together with filaments 1505. The second core portion 1503 and second shell portion 1504 are linked together with filaments 1506. After casting of the metal within the core-shell mold and leaching of the filaments (1505, 1506), the filaments (1505, 1506) define a cooling hole pattern in the cast turbine blade. As described above, these structures are preferably formed using the DLP process described in connection with FIGS. 6-10 and discussed above. By printing the ceramic mold using the above-mentioned DLP printing process, the mold can be made in a way that allows the point of connections between the core and shell to be provided through the filaments 1505 and/or 1506. Once the core-shell mold is printed, it may be inspected and the attachment mechanisms 1507-1512 may be joined. The attachment mechanisms may be attached using an adhesive or may be attached simply by the interface between the mechanisms (e.g., a slip fit or an interference fit). Further, the two halves may be held together using a clamping mechanism, strap, or some other well-known method of holding two halves of a ceramic mold together. Additionally the mold may be formed by more than two pieces depending on the needs of manufacturing or design of the part.

Figure 20:
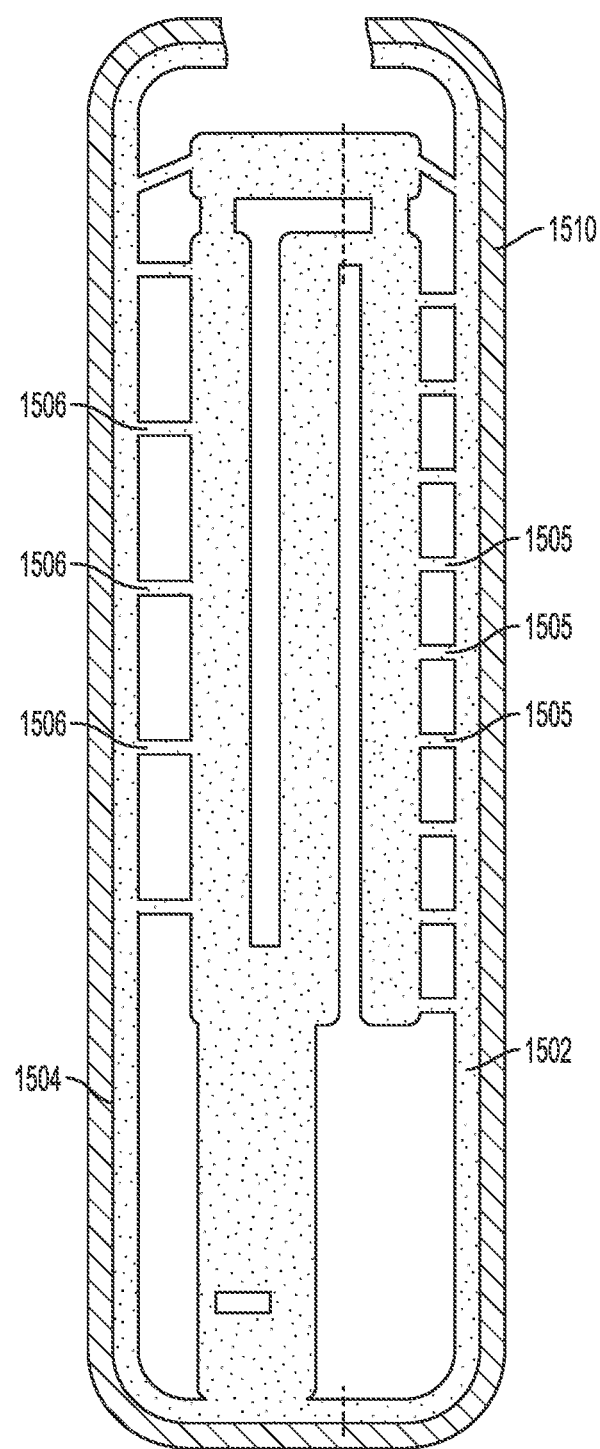
FIG. 20 shows a cross-section side view of an assembled two-part integral core-shell mold of FIG. 19 and having an outer ceramic coating applied in accordance with an embodiment of the invention.

FIG. 20 shows a cross-section side view of an assembled two-part integral core-shell mold of FIG. 19 and having an outer ceramic coating applied in accordance with an embodiment of the invention. As shown in FIG. 20, once the core-shell assembly 1500 molds via the attachment mechanisms, an outer ceramic layer 1510 may be formed on shells 1502 and/or 1504. It is noted that the shells 1502 and 1504 may be purposely formed thinner than is desired for a casting process, and the outer ceramic layer 1510 being formed to add structural stability to the mold and/or to hold the two core-shell mold halves together. Further, as discussed below, the outer ceramic layer and inner core-shell mold may be formed to optimize the heat conduction properties of the mold (e.g., for tailoring the microstructure of the cast super-alloy by manipulating the heat conduction properties of the mold). The outer ceramic layer 1510 may be formed as multiple layers formed through the dipping of the core-shell mold into a ceramic slurry, drying the slurry coating on the core-shell, and dipping the core-shell mold into either the same ceramic slurry and/or a different type of slurry to form an outer shell on the core-shell mold (1502 and/or 1504). Further, a refractory grain may be sifted or added onto the slurry coating between layers. It is noted that other forms of forming a ceramic coating could be used in lieu of or in combination with the dipping process mentioned above. For example, a ceramic and/or other material may be sprayed onto the core-shell. As an example, the above-mentioned slurry may include Colloidal silica and a ceramic powder (e.g. Al2O3, SiO2, ZrSiO4, ZrO2, Y2O3, AlN, SiC). The above-mentioned grain may be applied between layers and may include ceramic sand (e.g. Al2O3, SiO2, ZrSiO4, ZrO2, Y2O3, AlN, SiC) in a mesh of 90-120. Subsequent layers of slurry may be applied and subsequent layers of ceramic sand may be applied in 20-70 mesh and/or 10-30 mesh. After printing the core-shell mold structures and either before and/or after the outer ceramic layer 1510 is formed on the surface of the core shell molds (1502 and/or 1504), the core-shell mold and/or the outer ceramic layer 1510 may be cured and/or fired depending upon the requirements of the ceramic core photopolymer material and/or the outer ceramic core material(s). Molten metal may then be poured into the mold to form a cast object in the shape and having the features provided by the integrated core-shell mold.

As mentioned above, the filaments 1505 and 1506 are preferably cylindrical or oval shape but may be curved or non-linear. Their exact dimensions may be varied according to a desired film cooling scheme for a particular cast metal part. For example, cooling holes may have a cross sectional area ranging from 0.01 to 2 mm$^2$. In a turbine blade, the cross sectional area may range from 0.01 to 0.15 mm$^2$, more preferably from 0.05 to 0.1 mm$^2$, and most preferably about 0.07 mm$^2$. In the case of a vane or shroud, the cooling holes may have a cross sectional area ranging from 0.05 to 0.2 mm$^2$, more preferably 0.1 to 0.18 mm$^2$, and most preferably about 0.16 mm$^2$. The spacing of the cooling holes is typically a multiple of the diameter of the cooling holes ranging from 2× to 10× the diameter of the cooling holes, most preferably about 4-7× the diameter of the cooling holes.

The length of the filaments 1505 and/or 1506 is dictated by the thickness of the cast component, e.g., turbine blade or stator vane wall thickness, and the angle at which the cooling hole is disposed relative to the surface of the cast component. The typical lengths range from 0.5 to 5 mm, more preferably between 0.7 to 1 mm, and most preferably about 0.9 mm. The angle at which a cooling hole is disposed is approximately 5 to 35° relative to the surface, more preferably between 10 to 20°, and most preferably approximately 12°. It should be appreciated that the methods of casting according to an embodiment of the present invention allow for formation of cooling holes having a lower angle relative to the surface of the cast component than currently available using conventional machining techniques.

Figure 21:
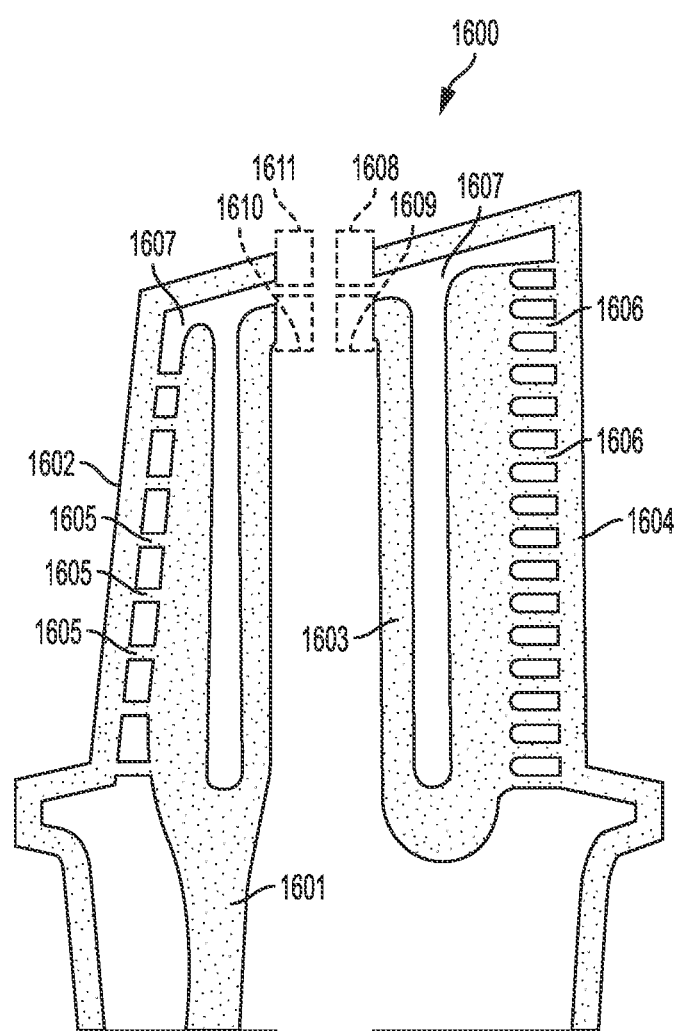
FIG. 21 shows a cross-section side view of a two-part integral core-shell mold including filaments extending from the core to the shell in accordance with an embodiment of the invention.

FIG. 21 shows a side view of an integrated core-shell mold 1600 according to an embodiment of the present invention. As shown in FIG. 21, the first core portion 1601 is connected to the first shell portion 1602 through several filaments 1605. Likewise, the second core portion 1602 is connected to the second shell portion 1604 through several filaments 1606. The first core portion 1601 and the first shell portion 1602 can be attached to the second core portion 1602 and the second shell portion 1604 via attachment mechanisms 1608, 1609, 1610 and 1611 to form the complete core-shell mold assembly 1600. The attachment mechanisms 1608-1611 may further include any structural interface that allows to the attachment mechanisms 1608-1611 to be joined with the desired accuracy. Additionally the assembled core-shell mold may be formed by more than two pieces depending on the needs of manufacturing or design of the part. The assembled core-shell mold 1600 defines a cavity 1607 for investment casting a turbine blade.

Figure 22:
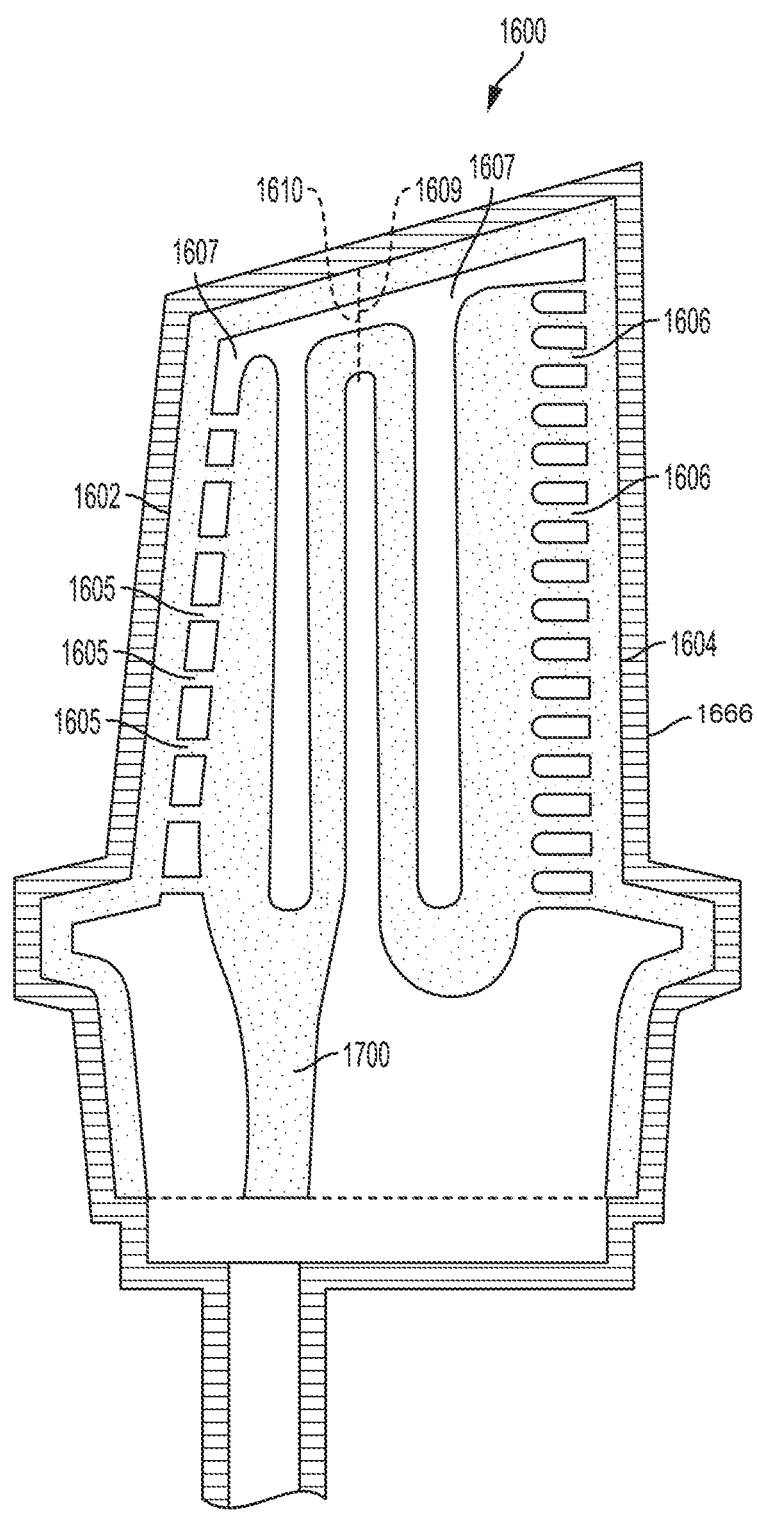
FIG. 22 shows a cross-section side view of an assembled two-part integral core-shell mold of FIG. 21 and having an outer ceramic coating applied in accordance with an embodiment of the invention.

FIG. 22 shows a cross-section side view of an assembled two-part integral core-shell mold of FIG. 21 and having an outer ceramic coating applied in accordance with an embodiment of the invention. As shown in FIG. 22, once the core-shell assembly 1600 molds via the attachment mechanisms mentioned and referenced above, an outer ceramic layer 1611 may be formed on shells 1602 and/or 1604. It is noted that the shells 1602 and 1604 may be purposely formed thinner than is desired for a casting process, and the outer ceramic layer 1611 being formed to add structural stability to the mold and/or to hold the two core-shell mold halves together. Further, as discussed below, the outer ceramic layer and inner core-shell mold may be formed to optimize the heat conduction properties of the mold (e.g., for tailoring the microstructure of the cast super-alloy by manipulating the heat conduction properties of the mold).

The outer ceramic layer 1611 may be formed as a multiple layers formed through the dipping of the core-shell mold into a ceramic slurry, drying the slurry coating on the core-shell, and dipping the core-shell mold into either the same ceramic slurry and/or a different type of slurry to form an outer shell on the core-shell mold 1602 and/or 1604. Further, a refractory grain may be sifted or added onto the slurry coating between layers. It is noted that other forms of forming a ceramic coating could be used in lieu of or in combination with the dipping process mentioned above. For example, a ceramic and/or other material may be sprayed onto the core-shell. As an example, the above-mentioned slurry may include Colloidal silica and a ceramic powder (e.g. Al2O3, SiO2, ZrSiO4, ZrO2, Y2O3, AlN, SiC). The above-mentioned grain may be applied between layers and may include ceramic sand (e.g. Al2O3, SiO2, ZrSiO4, ZrO2, Y2O3, AlN, SiC) in a mesh of 90-120. Subsequent layers of slurry may be applied and subsequent layers of ceramic sand may be applied in 20-70 mesh and/or 10-30 mesh. After printing the core-shell mold structures and either before and/or after the outer ceramic layer 1610 is formed on the surface of the core shell molds 1602 and/or 1604, the core-shell mold and/or the outer ceramic layer 1610 may be cured and/or fired depending upon the requirements of the ceramic core photopolymer material and/or the outer ceramic core material(s). Molten metal may be poured into the mold to form a cast object in the shape and having the features provided by the integrated core-shell mold.

FIG. 22 further shows the cavity 1607, which represents a void between the core 1601 and the shell 1602, 1604 to be filled with a metal (an example of which is shown as reference 1005 in FIG. 15), such as a nickel based alloy, i.e., INCONEL®. Upon leaching of the ceramic core-shell, the resulting cast object is a turbine blade, stator vane, or shroud having a cooling hole pattern in the surface of the blade, vane, or shroud. It should be appreciated that although the figures show a cross sectional view showing cooling holes at the leading and trailing edge of the turbine blade, that additional cooling holes may be provided where desired including on the sides of the turbine blades or any other location desired. In particular, the present invention may be used to form cooling holes within the casting process in any particular design. In other words, one would be able to produce conventional cooling holes in any pattern where drilling was used previously to form the cooling holes. However, the present invention will allow for cooling hole patterns previously unattainable due to the limitations of conventional technologies for creating cooling holes within cast components, i.e., drilling. After leaching, the resulting holes in the turbine blade or stator vane from the core print filaments may be brazed shut if desired. Otherwise the holes left by the core print filaments may be incorporated into the design of the internal cooling passages. Alternatively, cooling hole filaments may be provided to connect the tip plenum core to the shell in a sufficient quantity to hold a tip plenum core in place during the metal casting step.

Any of the above-mentioned methods can further be used to optimize the material properties of the mold. For example, the porosity of the outer ceramic layer (e.g., 910, 1004, 1510, 1611) may be optimized so as to control the conduction of heat through the core-shell mold and outer ceramic layer. For example, it may be desired to improve the structural rigidity of the core-shell without having a significant impact on the heat conduction through the core-shell during the solidification of the metal within the mold; accordingly, a ceramic material having a certain porosity may be used to improve the convection of heat through the layer. Further, the outer ceramic layer may be formed of a material having a high thermal conductivity and/or may be provided as a thinner layer, so as to increase the rate of heat transfer and decrease the amount of time required for solidification of the metal within the mold. Conversely, it may be desired to decrease the heat transfer from the metal within the mold; accordingly, the outer ceramic layer may be provided with a high porosity, may be a thicker layer, and/or may be a material having a low thermal conductivity. It may further be desired to control the heat conductivity so that the rate of cooling differs along different sections of the mold. For example, one portion of the core-shell and/or outer ceramic layer may be formed thicker or thinner depending the heat conduction properties that are desired in that portion of the mold. This strategy may be used to tailor the material properties of the finished product. For instance, by controlling the rate of cooling, the crystal growth may be controlled in the solidification of the superalloy material within the mold. According to another exemplary embodiment, the outer ceramic layer may include a first portion formed of a ceramic material having a first thermal conductivity, and a second portion formed of a ceramic material having a second thermal conductivity, wherein the first thermal conductivity and second conductivity differ. In any of the abovementioned examples, the thermal conductivity of the first portion and a second portion may vary ±0.05% or greater. In another example, several outer ceramic layers may be formed of ceramic materials having differing thermal conductivity to further control the solidification of the metal within the mold. Further, other features may be integrated into the core-shell mold and/or the outer ceramic shell to modify either the thermal properties and/or the structural properties of the mold. For example, the core-shell mold may be formed with stiffening ribs on the outer shell for tailoring the structural properties of the mold. The core-shell mold may further include heat-sink structures such as pins to change the thermal conductivity of the core-shell mold either across the entire outer surface or in selected portions of the mold. Further, the surface of the core-shell mold may be provided with air gaps and/or thicker and thinner portions between the layers to alter the thermal conductivity and/or insulation qualities of the finished mold. The air gaps may be provided throughout the entire mold or may be provided in selected portions of the mold where it is desired to slow down heat transfer during the solidification of the metal inside the mold.

Figure 23:
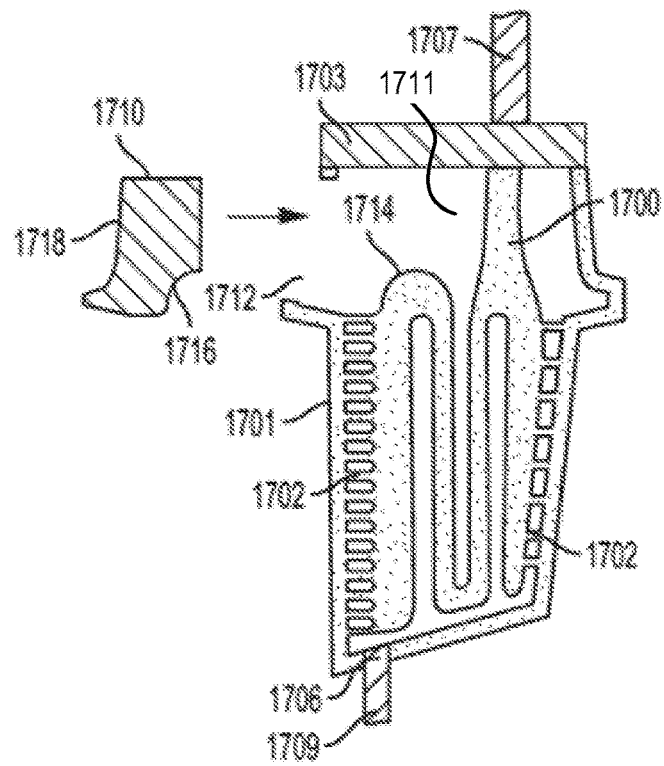
FIG. 23 shows a cross-section side view of an integral core-shell mold having an opening and a plug in accordance with one embodiment of the invention.

FIG. 23 shows a side view of an integrated core-shell mold according to an embodiment of the present invention. As shown in FIG. 23, the core 1700 is connected to the shell 1701 through several filaments 1702. The core 1700 and the shell 1701 forms the core-shell mold which defines a cavity 1711 for investment casting a component, which in this example is a turbine blade. The core-shell mold may be connected to a wax component, which may comprise at least one of a wax gate component. The wax gate component may comprise a wax tube 1709, 1707, and/or a wax plug 1708 and/or any selected portion of the final cast article. The core-shell mold may include a passageway 1706 in fluid communication with an inner cavity 1711 of the core-shell mold. The passageway 1706 may have a wax component 1709, which may include a wax gate component such as a tube, for example. A hole 1706 or a plurality of holes may be integrated with a portion of the cavity 1711. Further, the core-shell mold may include an opening 1712, which may be in fluid communication with the cavity 1711. At any point during the abovementioned processes a plug 1718 may be used to cover the opening 1712 prior to coating the core-shell mold with an outer ceramic layer. The plug 1718 may be formed of a wax, a plastic, or any combination thereof. Further, the plug 1718 may be formed using a 3-D printing and/or additive manufacturing process. The plug 1718 may have an outer surface that includes a specific desired geometry of the outer surface of the finished component, so that that once the plug is coated with the outer ceramic layer and removed, a specific mold geometry in the region previously defined by the opening 1712 is formed. The plug 1718 may also include an internal geometry 1710, 1716 to ensure the plug is correctly placed and oriented when the plug is installed in the opening 1712 and before the outer ceramic shell is formed on a surface of the plug. For example, a notch 1716 may be formed to interface with an inner portion of the core shell mold 1714.

The opening 1712 may be used for inspection and/or may include a portion of the mold that is desirable to have altered or changed in the manufacturing process. For example, it may be desirable to form a first turbine blade having a first outer geometry and a second turbine blade having a second outer geometry while using the same core-shell mold. The first and/or second external geometries may be formed by installing a first plug having a first geometry into the opening 1712 of a first core-shell mold and installing a second plug having a second geometry into the opening 1712 of a second core-shell mold, wherein the first and second core-shell molds have substantially identical geometries. The plug 1718 may also be altered based on a desired change or alteration in geometry without having to alter or form a new ceramic core-shell mold.

Figure 24:
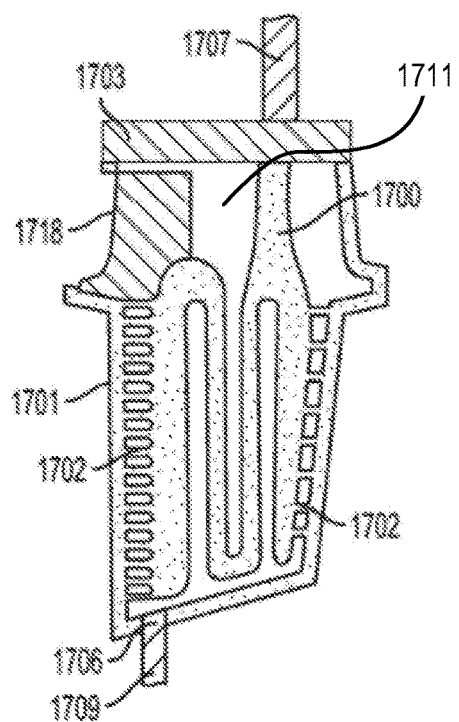
FIG. 24 shows a cross-section side view of the integral core-shell mold of FIG. 23 and having a plug installed in accordance with one embodiment of the invention.
Figure 25:
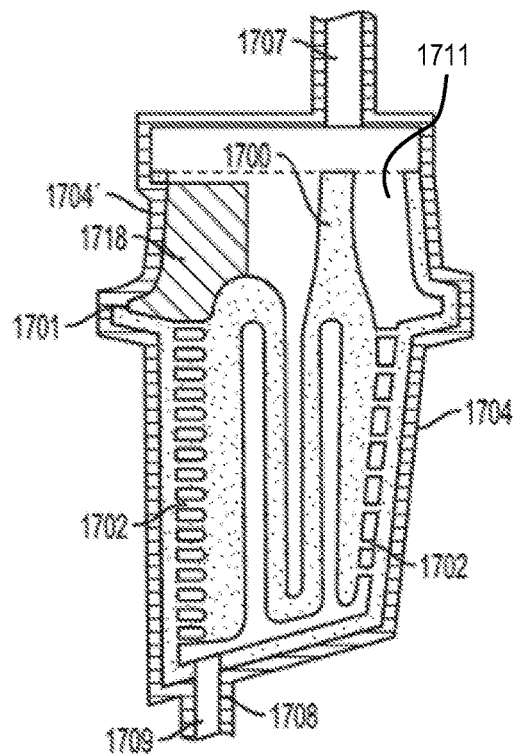
FIG. 25 shows a cross-section side view of the integral core-shell mold of FIG. 24 and having an outer ceramic shell in accordance with an embodiment of the invention.

As shown in FIG. 24, the core-shell mold may be formed and any optional wax component (e.g. 1703, 1706, 1707, and 1709) may be connected, and the plug 1718 may be installed into opening 1712 of the core-shell mold prior to forming the outer ceramic layer. As shown in FIG. 25, an outer ceramic layer 1704 may then be formed on the outer surface 1701 of the core-shell mold, the plug 1718, and any wax component (e.g. 1703, 1706, 1707, and 1709). The outer ceramic layer 1704 may be formed through dipping of the core-shell mold into a ceramic slurry. The outer ceramic layer 1704 may further be formed as a single layer formed through the dipping of the core-shell mold, the plug, and/or the gate portions into a ceramic slurry, drying the slurry, and dipping the core-shell mold into a either the same ceramic slurry and/or different type of slurry to form an outer shell on the core-shell mold. Further, a refractory grain may be sifted onto the slurry coating between layers. It is noted that other forms of forming a ceramic coating could be used in lieu of or in combination with the dipping process mentioned above. For example, a ceramic and/or other material may be sprayed onto the core-shell.

As an example, the above-mentioned slurry may include colloidal silica and a ceramic powder (e.g. Al2O3, SiO2, ZrSiO4, ZrO2, Y2O3, AlN, SiC). The above-mentioned grain may be applied between layers and may include ceramic sand (e.g. Al2O3, SiO2, ZrSiO4, ZrO2, Y2O3, AlN, SiC) in a mesh of 90-120. Subsequent layers of slurry may be applied and subsequent layers of ceramic sand may be applied in 20-70 mesh and/or 10-30 mesh. Once the necessary outer layer is formed on the core-shell, the wax components (e.g. 1703, 1706, 1707, and 1709) and/or plug may be removed prior to or simultaneously with a firing process to sinter the materials of the core-shell mold and/or the outer ceramic layer 1704; after which, any of the above-mentioned metals (e.g. superalloy) may be poured into the mold.

Figure 26:
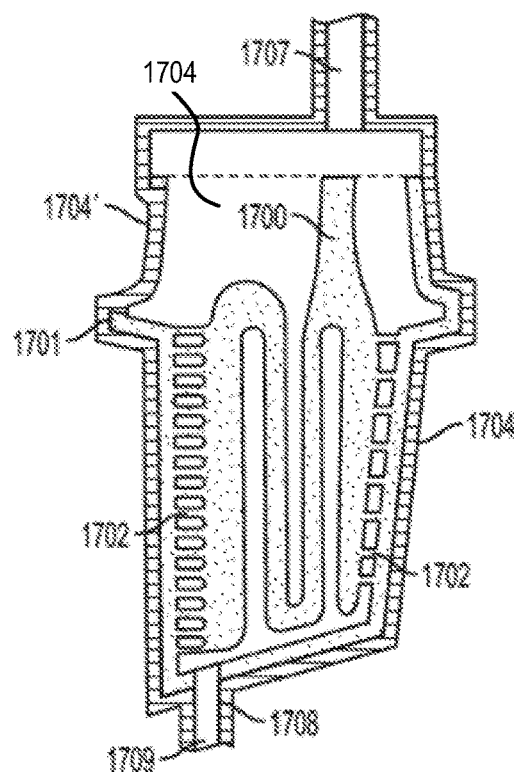
FIG. 26 shows a cross-section view of the integral core-shell mold of FIG. 25 and having the plug removed in accordance with an embodiment of the invention.

As shown in FIGS. 25 and 26, once the outer ceramic layer 1704 is formed, the wax portions (e.g. 1703, 1706, 1707, and 1709) may be removed through either melting and/or a chemical removal process. Further, as shown in FIG. 26, the plug 1718 may be removed through similar and/or identical processes either before and/or after the removal of the wax components 1703, 1706, 1707, and 1709. The plug 1718 may also be removed simultaneously with the removal of any wax components. The passages corresponding to the wax gate portions 1703, 1706, 1707, 1709 form a cavity which may be in fluid communication with the inner cavity 1711 of the core-shell mold. Further, once the plug is removed, the ceramic layer 1704' forms a cover/mold portion corresponding to the opening 1712 and having an inner geometry corresponding to the outer geometry of the previously placed plug 1718.

After the outer shell 1704 and 1704' is formed, the cavity 1711 is filled with metal (e.g. as shown by reference 1005 in FIGS. 13 and 14), such as a nickel based alloy, e.g., INCONEL®. Once the metal is hardened, the ceramic core and/or shell may be leached out. Upon leaching of the ceramic core-shell, the resulting cast component may be a turbine blade having a cooling hole pattern in the surface of the blade. It should be appreciated that although the figures provide a cross sectional view showing cooling holes at the leading and trailing edge of the turbine blade, that additional cooling holes may be provided where desired including on the sides of the turbine blades or any other location desired. In particular, the present invention may be used to form cooling holes within the casting process in any particular design. In other words, one would be able to produce conventional cooling holes in any pattern where drilling was used previously to form the cooling holes. Further, as mentioned above, the ceramic shell portion 1704' provides a mold portion corresponding with the previously place plug 1718 and allows for inspection and/or modification of the core-shell mold. The plug 1718, along with the abovementioned advantages allow for a portion of the ceramic core-shell mold to be removed and replaced by the plug 1718. Further, the use of a plug 1718 may allow for a portion of the ceramic shell 1704' to be thinner than the portion of the core-shell mold having a shell and an outer shell 1704. Further the ceramic shell portion 1704' may be a material having differing thermal or structural qualities than the core-shell mold.

Figure 27:
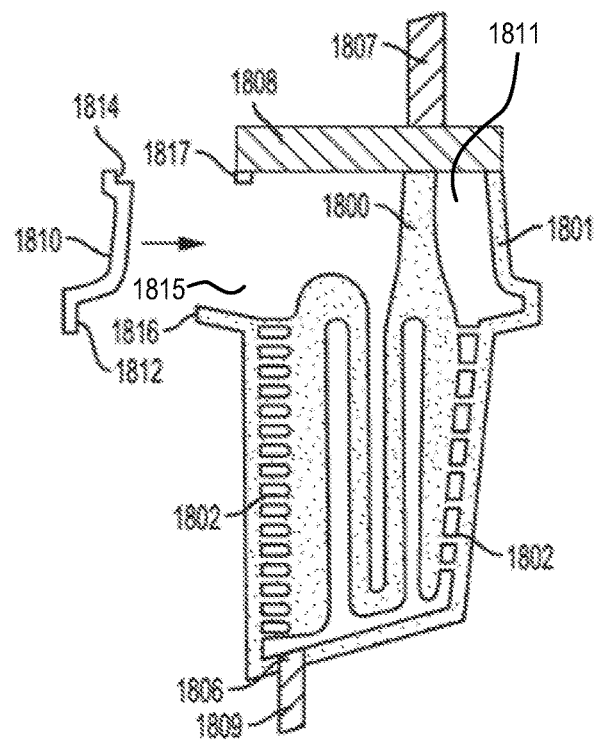
FIG. 27 shows a cross-section view of an integrated core-shell mold having an opening and a ceramic cover plate in accordance with an embodiment of the invention.
Figure 28:
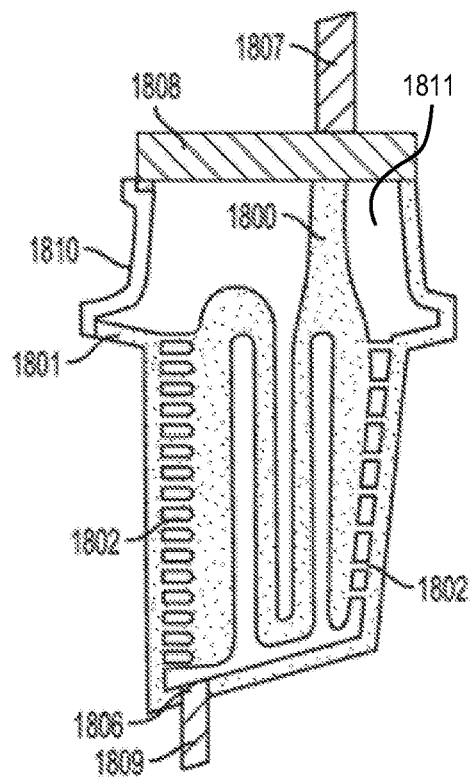
FIG. 28 shows a cross-section view of the integrated core-shell mold of FIG. 27 and having the ceramic cover plate installed to cover the opening.

FIG. 27 shows a side view of an integrated core-shell mold according to another embodiment of the present invention. As similarly to the other abovementioned embodiments, and as shown in FIG. 27, the core 1800 may be connected to the shell 1801 through several filaments 1802. The core 1800 and the shell 1801 form a core-shell mold which defines a cavity 1811 for investment casting a component, which in this example is a turbine blade. The core-shell mold may be connected to at least one wax component, which may comprise at least one of a wax gate component. The wax gate component may comprise a wax tube 1809, 1807, and/or a wax plug 1808 and/or any selected portion of the final cast article. The core-shell mold may include a passageway 1806 in fluid communication with an inner cavity 1811 of the core-shell mold. The passageway 1806 may have a wax component 1809, which may include a wax gate component such as a tube, for example. A hole 1806 or a plurality of holes may be integrated with a portion of the cavity 1811. Further, the core-shell mold may include an opening 1815, which may be in fluid communication with the cavity 1811. At any point during the abovementioned processes a ceramic cover 1810 may be used to cover the opening 1815 prior to coating the core-shell mold with an outer ceramic layer. The ceramic cover 1810 may be formed of a ceramic having the same or different properties than the core-shell mold. Further, the ceramic 1810 may be formed using known 3-D printing and/or additive manufacturing process, including the abovementioned processes. The cover 1810 may have an inner surface that includes a specific desired geometry of the outer surface of the finished component, so that that once the ceramic cover is installed into the opening and is coated with the outer ceramic layer, a specific mold geometry in the region previously defined by the opening 1812 is formed. The ceramic cover 1810 may also include engaging portions 1814 and 1812, to ensure the ceramic cover is correctly placed and oriented when the ceramic cover is installed in the opening 1812 and before the outer ceramic shell is formed on a surface of the plug. For example, engaging portions 1812 and 1814 may engage with engagement portions 1816 and 1817 on the core-shell mold as shown in FIG. 28. It is noted that the abovementioned engaging and engagement portions are not limited to the structure shown; for example, the engaging portions may be provided so as to engage with an engagement portion provided on the core portion 1800 of the core-shell mold.

The opening 1816 may be used for inspection and/or may include a portion of the mold that is desirable to have altered or changed in the manufacturing process. For example, it may be desirable to form a first turbine blade having a first outer geometry and a second turbine blade having a second outer geometry while using the same core-shell mold. The first and/or second external geometries may be formed by installing a first ceramic cover having a first geometry into the opening 1816 of a first core-shell mold and installing a second ceramic cover having a second geometry into the opening 1816 of a second core-shell mold, wherein the first and second core-shell molds have substantially identical geometries. The ceramic cover 1810 may also be altered based on a desired change or alteration in geometry without having to alter or form a new ceramic core-shell mold.

Figure 29:
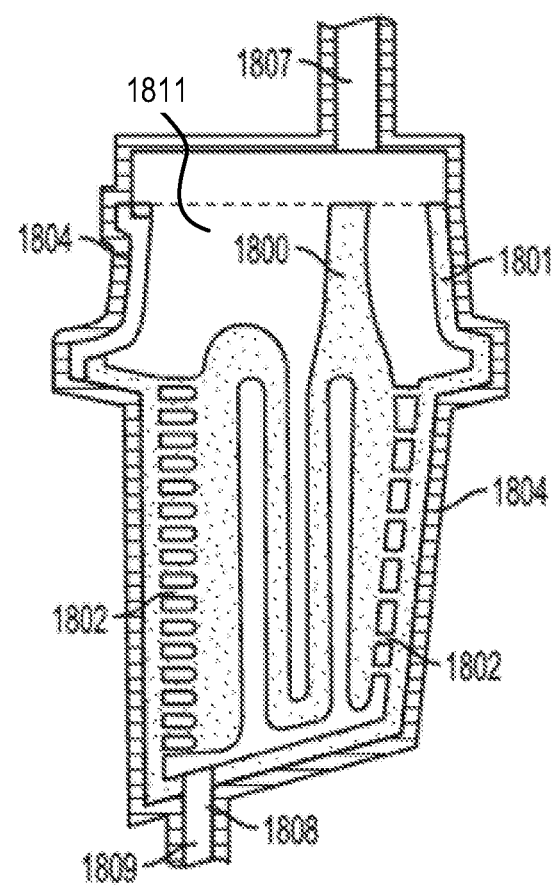
FIG. 29 shows a cross-section view of the integrated core-shell mold of FIG. 28 and having an outer ceramic shell in accordance with an embodiment of the invention.

As shown in FIG. 28, the core-shell mold may be formed and any optional wax component (e.g. 1803, 1806, 1807, and 1809) may be connected, and the ceramic cover 1810 may be installed into opening 1815 of the core-shell mold prior to forming the outer ceramic layer. As shown in FIG. 29, an outer ceramic layer 1804 may then be formed on the outer surface 1801 of the core-shell mold, the ceramic cover 1810, and any wax component (e.g. 1803, 1806, 1807, and 1809). The outer ceramic layer 1804 may be formed through dipping of the core-shell mold into a ceramic slurry. The outer ceramic layer 1804 may further be formed as a single and/or multi-layer substrate formed through the dipping of the core-shell mold, the ceramic cover, and/or the gate portions into a ceramic slurry, drying the slurry, and dipping the core-shell mold into a either the same ceramic slurry and/or different type of slurry to form an outer shell on the core-shell mold. Further, a refractory grain may be sifted onto the slurry coating between layers. It is noted that other forms of forming a ceramic coating could be used in lieu of or in combination with the dipping process mentioned above. For example, a ceramic and/or other material may be sprayed onto the core-shell.

As an example, the above-mentioned slurry may include any of the above-mentioned materials or materials known in the art; for example: colloidal silica and a ceramic powder (e.g. $Al_2O_3$, $SiO_2$, $ZrSiO_4$, $ZrO_2$, $Y_2O_3$, AlN, SiC). The above-mentioned grain may be applied between layers and may include ceramic sand (e.g. $Al_2O_3$, $SiO_2$, $ZrSiO_4$, $ZrO_2$, $Y_2O_3$, AlN, SiC) in a mesh of 90-120. Subsequent layers of slurry may be applied and subsequent layers of ceramic sand may be applied in 20-70 mesh and/or 10-30 mesh. Once the necessary outer layer is formed on the core-shell mold, the ceramic cover, the wax components (e.g. 1803, 1806, 1807, and 1809), the wax components may be removed prior to or simultaneously with a firing process to sinter the materials of the core-shell mold, the ceramic cover 1810, and/or the outer ceramic layer 1804; after which, any of the above-mentioned metals (e.g. superalloy) may be poured into the mold.

Once the outer ceramic layer 1804 is formed, the wax portions (e.g. 1803, 1806, 1807, and 1809) may be removed through either melting and/or a chemical removal process. Once the wax portions are removed, passages corresponding to the wax portions 1803, 1806, 1807, 1809 form a cavity which may be in fluid communication with the inner cavity 1811 of the core-shell mold. Further, once the outer ceramic layer 1804 is formed, the ceramic door 1810 becomes portion of the mold having an inner geometry corresponding to the desired outer geometry of the component.

After the outer shell 1804 is formed, the cavity 1811 is filled with metal (e.g. as shown by reference 1005 in FIGS. 13 and 14), such as a nickel based alloy, e.g., INCONEL®. Once the metal is hardened, the ceramic core and/or shell may be leached out. Upon leaching of the ceramic core-shell, the resulting cast component may be a turbine blade having a cooling hole pattern in the surface of the blade. It should be appreciated that although the figures provide a cross sectional view showing cooling holes at the leading and trailing edge of the turbine blade, that additional cooling holes may be provided where desired including on the sides of the turbine blades or any other location desired. In particular, the present invention may be used to form cooling holes within the casting process in any particular design. In other words, one would be able to produce conventional cooling holes in any pattern where drilling was used previously to form the cooling holes. Further, as mentioned above, the ceramic shell portion 1804 and ceramic cover 1810 provides a mold portion corresponding with the installed ceramic cover 1810. As mentioned above, the ceramic cover 1810 may be used to allow for inspection and/or modification of the core-shell mold. The ceramic cover 1810, along with the abovementioned advantages allows for a portion of the ceramic core-shell mold to be removed and replaced by ceramic cover 1810. Further, the use of the ceramic cover 1810 may allow for a portion of the ceramic shell 1804 to be thinner than the portion of the core-shell mold having a shell and an outer shell 1804. Further the ceramic cover 1810 may be formed a material having differing thermal or structural qualities than the core-shell mold and the outer ceramic shell 1804.

In an aspect, the present invention relates to the core-shell mold structures of the present invention incorporated or combined with features of other core-shell molds produced in a similar manner. The following patent applications include disclosure of these various aspects and their use:

U.S. patent application Ser. No. 15/377,728, titled "INTEGRATED CASTING CORE-SHELL STRUCTURE", and filed Dec. 13, 2016;

U.S. patent application Ser. No. 15/377,711, titled "INTEGRATED CASTING CORE-SHELL STRUCTURE WITH FLOATING TIP PLENUM", and filed Dec. 13, 2016;

U.S. patent application Ser. No. 15/377,796, titled "MULTI-PIECE INTEGRATED CORE-SHELL STRUCTURE FOR MAKING CAST COMPONENT", and filed Dec. 13, 2016;

U.S. patent application Ser. No. 15/377,746, titled "MULTI-PIECE INTEGRATED CORE-SHELL STRUCTURE WITH STANDOFF AND/OR BUMPER FOR MAKING CAST COMPONENT", and filed Dec. 13, 2016;

U.S. patent application Ser. No. 15/377,673, titled "INTEGRATED CASTING CORE SHELL STRUCTURE WITH PRINTED TUBES FOR MAKING CAST COMPONENT", and filed Dec. 13, 2016;

U.S. patent application Ser. No. 15/377,787, titled "INTEGRATED CASTING CORE SHELL STRUCTURE FOR MAKING CAST COMPONENT WITH NON-LINEAR HOLES", and filed Dec. 13, 2016, now abandoned;

U.S. patent application Ser. No. 15/377,783, titled "INTEGRATED CASTING CORE SHELL STRUCTURE FOR MAKING CAST COMPONENT WITH COOLING HOLES IN INACCESSIBLE LOCATIONS", and filed Dec. 13, 2016, now U.S. Pat. No. 10,807,154;

U.S. patent application Ser. No. 15/377,766, titled "INTEGRATED CASTING CORE SHELL STRUCTURE FOR MAKING CAST COMPONENT HAVING THIN ROOT COMPONENTS", and filed Dec. 13, 2016.

The disclosures of each of these applications are incorporated herein in their entirety to the extent they disclose additional aspects of core-shell molds and methods of making that can be used in conjunction with the core-shell molds disclosed herein.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

What is claimed is:

1. A method of preparing a cast component using a casting mold, the method comprising:
   providing a molten metal into the casting mold, wherein the casting mold comprises:
   a core-shell mold formed of a first ceramic material, wherein the core-shell mold includes a shell, a core, a plurality of filaments joining the core to the shell, the plurality of filaments being monolithic with the core and the shell, and at least a first hollow cavity between the core and the shell; and
   an outer ceramic layer formed of a second ceramic material, wherein the outer ceramic layer coats at least a portion of the core-shell mold, wherein the outer ceramic layer has at least one different thermal property than the core-shell mold,
   wherein each of the plurality of filaments spans between the core and the shell, the plurality of filaments adapted to define a plurality of holes providing fluid communication between the first hollow cavity within the cast component defined by the core and an outer surface of the cast component upon removal of the casting mold.

2. The method of preparing the cast component of claim 1, wherein the casting mold further comprises a second hollow cavity bounded by the outer ceramic layer, wherein the second hollow cavity is in fluid communication with the first hollow cavity.

3. The method of preparing the cast component of claim 2, wherein the molten metal is provided to the first hollow cavity through the second hollow cavity.

4. The method of preparing the cast component of claim 2, wherein the at least one different thermal property includes at least one of a heat transfer coefficient or porosity.

5. The method of preparing the cast component of claim 1, wherein the casting mold further comprises a second shell formed of a second material different from the first ceramic material, wherein the second shell at least partially contacts a surface of the shell, wherein the second shell has a different thermal property than the shell.

6. The method of preparing the cast component of claim 1, wherein the second ceramic material is a different ceramic material from the first ceramic material.

7. The method of preparing the cast component of claim 6, wherein the first ceramic material and the second ceramic material have a different hardness.

8. The method of preparing the cast component of claim 1, wherein the molten metal comprises a superalloy metal.

9. The method of preparing the cast component of claim 1, further comprising:
solidifying the molten metal to form the cast component.

10. The method of preparing the cast component of claim 9, further comprising:
after solidifying the molten metal, removing the core-shell mold and the outer ceramic layer.

11. The method of preparing the cast component of claim 1, wherein providing the molten metal into the casting mold comprises:
filtering the molten metal; and
pouring the molten metal into the casting mold.

* * * * *